United States Patent
Nikara et al.

(10) Patent No.: US 9,426,408 B2
(45) Date of Patent: Aug. 23, 2016

(54) METHOD AND APPARATUS FOR RECORDING VIDEO SEQUENCES

(75) Inventors: Jari Nikara, Lampaala (FI); Mika Pesonen, Tampere (FI); Eero Aho, Tampere (FI)

(73) Assignee: Nokia Technologies Oy, Espoo (FI)

( * ) Notice: Subject to any disclaimer, the term of this patent is extended or adjusted under 35 U.S.C. 154(b) by 34 days.

(21) Appl. No.: 14/414,952

(22) PCT Filed: Aug. 27, 2012

(86) PCT No.: PCT/FI2012/050811
§ 371 (c)(1),
(2), (4) Date: Jan. 15, 2015

(87) PCT Pub. No.: WO2014/033347
PCT Pub. Date: Mar. 6, 2014

(65) Prior Publication Data
US 2015/0222845 A1 Aug. 6, 2015

(51) Int. Cl.
*H04N 9/80* (2006.01)
*H04N 5/91* (2006.01)
*H04N 5/232* (2006.01)
*H04N 5/77* (2006.01)
*G06F 3/0488* (2013.01)
*G06F 3/0484* (2013.01)

(52) U.S. Cl.
CPC ............. *H04N 5/91* (2013.01); *G06F 3/0488* (2013.01); *G06F 3/04847* (2013.01); *H04N 5/23206* (2013.01); *H04N 5/23216* (2013.01); *H04N 5/23293* (2013.01); *H04N 5/772* (2013.01)

(58) Field of Classification Search
CPC ............... H04N 5/91; H04N 5/23206; H04N 5/23216; H04N 5/23293; H04N 5/772; G06F 3/0488; G06F 3/04847
USPC .......................... 386/248, 239, 224, 227, 323
See application file for complete search history.

(56) References Cited

U.S. PATENT DOCUMENTS 8,083,646 B2 * 12/2011 Chapa, Jr. .......... A63B 24/0006
482/1
8,823,829 B2 * 9/2014 Imai ....................... H04N 5/142
348/222.1

(Continued)

OTHER PUBLICATIONS

International Search Report and Written Opinion received for corresponding Patent Cooperation Treaty Application No. PCT/FI2012/050811, dated Jun. 3, 2013, 14 pages.

(Continued)

*Primary Examiner* — Robert Chevalier
(74) *Attorney, Agent, or Firm* — Nokia Technologies Oy

(57) ABSTRACT

A method for recording a video sequence comprises: —receiving a first instruction, which defines the position of a first boundary with respect to a preview image, —receiving a second instruction, which defines the position of a second boundary, —determining the position of a first sensor portion according the position of the first boundary, —determining the position of a second sensor portion according the second instruction, —providing first sensor data by forming a first optical image on an image sensor, —providing second sensor data by forming a second optical image on the image sensor, —determining a first image frame from the first sensor data obtained from the first sensor portion, —determining a second image frame from the second sensor data obtained from the second sensor portion, and —storing the first image frame and the second image frame.

20 Claims, 15 Drawing Sheets

(56) References Cited

U.S. PATENT DOCUMENTS

| | | |
|---|---|---|
| 2005/0012824 A1 | 1/2005 | Stavely et al. |
| 2008/0266414 A1 | 10/2008 | Park |
| 2010/0020221 A1 | 1/2010 | Tupman et al. |
| 2011/0310279 A1 | 12/2011 | Enge et al. |

OTHER PUBLICATIONS

Barreiro-Megino, et al., "Visual tools for ROI montage in an Image2Video application", IEEE Trans. on Circuits and Systems for Video Technology, vol. 19, No. 12, Dec. 2009, pp. 1927-1932.

* cited by examiner

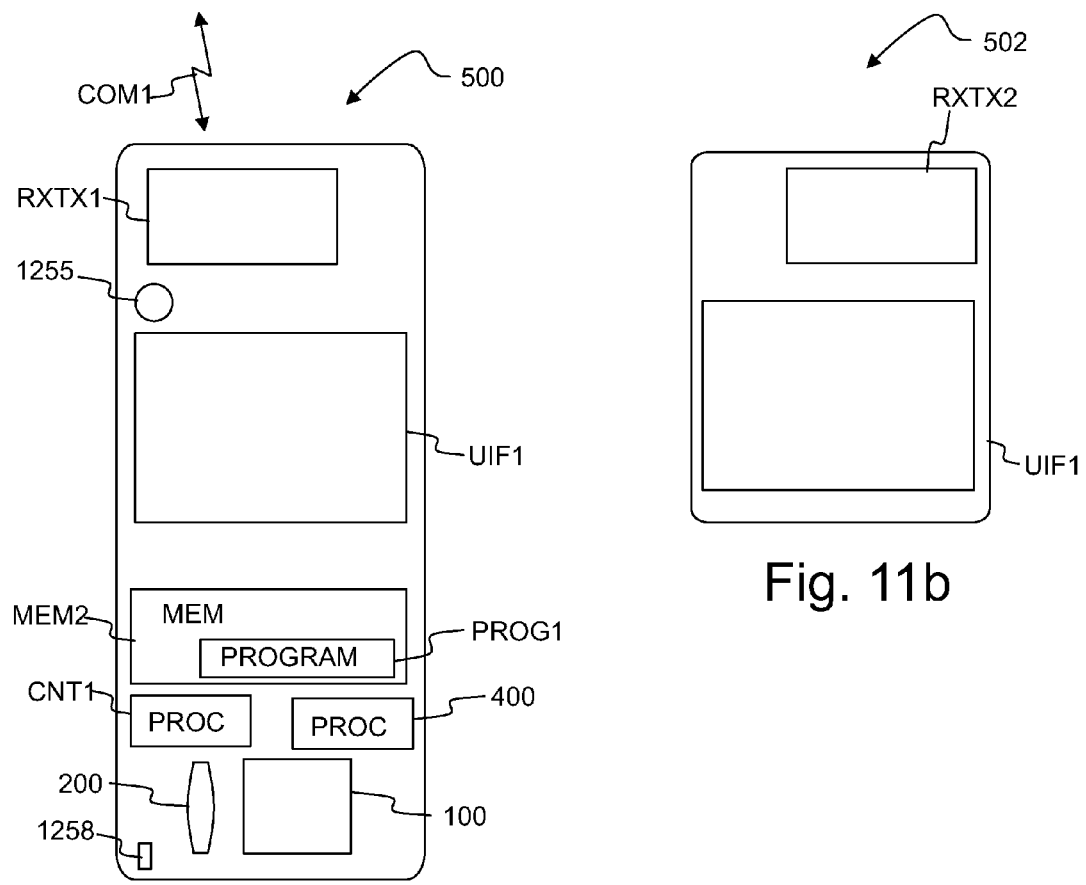
Fig. 11a
Fig. 11b
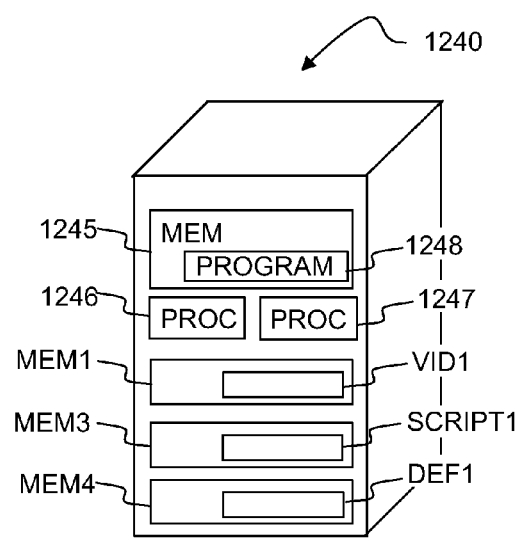
Fig. 11c

METHOD AND APPARATUS FOR RECORDING VIDEO SEQUENCES

RELATED APPLICATION

This application was originally filed as Patent Cooperation Treaty Application No. PCT/FI2012/050811 filed Aug. 27, 2012.

FIELD

Various embodiments relate to recording video sequences.

BACKGROUND

A video sequence of an event may be recorded by using a camera. One or more objects may be moving during the event. The user may manually adjust the orientation of the camera during movements of the objects in order to aim the camera at the most relevant object. The user may also manually adjust the zoom level during movements of the objects in order to capture relevant details of the objects with high resolution.

SUMMARY

Some embodiments provide a method for recording a video sequence. Some embodiments provide a computer program for recording a video sequence. Some embodiments provide computer program product comprising computer program for recording a video sequence. Some embodiments provide an apparatus for recording a video sequence. Some embodiments provide a means for recording a video sequence.

According to a first aspect, there is provided a method, which comprises:
receiving a first instruction, which defines the position of a first boundary with respect to a preview image,
receiving a second instruction, which defines the position of a second boundary with respect to the preview image, a framing path, or a tracking mode,
determining the position of a first sensor portion according to the position of the first boundary,
determining the position of a second sensor portion according to the second instruction,
providing first sensor data by forming a first optical image on an image sensor after receiving the second instruction,
providing second sensor data by forming a second optical image on the image sensor after the first optical image has been formed,
determining a first image frame from the first sensor data obtained from the first sensor portion,
determining a second image frame from the second sensor data obtained from the second sensor portion, and
storing and/or transmitting the first image frame and the second image frame.

According to a second aspect, there is provided a computer program, which comprises computer program code configured to, when executed on at least one processor, cause an apparatus or a system to:
receive a first instruction, which defines the position of a first boundary with respect to a preview image,
receive a second instruction, which defines the position of a second boundary with respect to the preview image, a framing path, or a tracking mode,
determine the position of a first sensor portion according to the position of the first boundary,
determine the position of a second sensor portion according to the second instruction,
provide first sensor data by forming a first optical image on an image sensor after receiving the second instruction,
provide second sensor data by forming a second optical image on the image sensor after the first optical image has been formed,
determine a first image frame from the first sensor data obtained from the first sensor portion,
determine a second image frame from the second sensor data obtained from the second sensor portion, and
store and/or transmit the first image frame and the second image frame.

According to a third aspect, there is provided a computer program product embodied on a non-transitory computer readable medium, comprising computer program code configured to, when executed on at least one processor, cause an apparatus or a system to:
receive a first instruction, which defines the position of a first boundary with respect to a preview image,
receive a second instruction, which defines the position of a second boundary with respect to the preview image, a framing path, or a tracking mode,
determine the position of a first sensor portion according to the position of the first boundary,
determine the position of a second sensor portion according to the second instruction,
provide first sensor data by forming a first optical image on an image sensor after receiving the second instruction,
provide second sensor data by forming a second optical image on the image sensor after the first optical image has been formed,
determine a first image frame from the first sensor data obtained from the first sensor portion,
determine a second image frame from the second sensor data obtained from the second sensor portion, and
store and/or transmit the first image frame and the second image frame.

According to a fourth aspect, there is provided a means for recording a video sequence, comprising:
means for receiving a first instruction, which defines the position of a first boundary with respect to a preview image,
means for receiving a second instruction, which defines the position of a second boundary with respect to the preview image, a framing path, or a tracking mode,
means for determining the position of a first sensor portion according to the position of the first boundary,
means for determining the position of a second sensor portion according to the second instruction,
means for providing first sensor data by forming a first optical image on an image sensor after receiving the second instruction,
means for providing second sensor data by forming a second optical image on the image sensor after the first optical image has been formed,
means for determining a first image frame from the first sensor data obtained from the first sensor portion,
means for determining a second image frame from the second sensor data obtained from the second sensor portion, and
means for storing and/or means for transmitting the first image frame and the second image frame.

According to a fifth aspect, there is provided an apparatus comprising at least one processor, a memory including computer program code, the memory and the computer program code configured to, with the at least one processor, cause the apparatus to perform at least the following:

receive a first instruction, which defines the position of a first boundary with respect to a preview image,
    receive a second instruction, which defines the position of a second boundary with respect to the preview image, a framing path, or a tracking mode,
    determine the position of a first sensor portion according to the position of the first boundary,
    determine the position of a second sensor portion according to the second instruction,
    provide first sensor data by forming a first optical image on an image sensor after receiving the second instruction,
    provide second sensor data by forming a second optical image on the image sensor after the first optical image has been formed,
    determine a first image frame from the first sensor data obtained from the first sensor portion,
    determine a second image frame from the second sensor data obtained from the second sensor portion, and
    store and/or transmit the first image frame and the second image frame.

One or more objects may be moving during an event. A video sequence of the event may be recorded according to a video script. The user may create the video script based on anticipated positions of the objects which are likely to be shown in the video sequence. The user may create the video script before the video sequence of the event is recorded.

The video sequence may be captured smoothly in a pre-programmed way, as defined by the video script. The video sequence may comprise several video shots. A video shot may comprise several image frames. The video sequence may be captured so that the video shots may be stable and the transitions between consecutive video shots may be smooth.

The video sequence may comprise a first video shot recorded according to a first framing and a second video shot recorded according to a second framing. The video script may comprise defining, in advance, the framing of the first video shot and defining the framing of the second video shot. The "framing" may mean defining the borders of an image frame.

A preview image showing one or more objects may be captured by using the camera. The user of the camera may create the video script for a video sequence by defining the first boundary and the second boundary. The user of the camera may define the size and position of the first boundary with respect a feature appearing in the preview image. The user of the camera may define the size and position of the second boundary with respect to the first boundary. In particular, the second boundary may be displaced with respect to the first boundary. The preview image may be displayed on a touch screen, and the first boundary and the second boundary may be defined e.g. by using the touch screen. The preview image may be displayed on a display, and the first boundary and the second boundary may be defined e.g. by using a touch pad, a keypad, a mouse, trackball and/or a joystick.

After the boundaries have been defined, the actual video sequence may be recorded according to the defined boundaries. During a first time period, the image frames stored in the memory may be framed according to the first boundary. During a second time period, the image frames stored in the memory may be framed according to the second boundary.

The optics of the camera may be arranged to form an optical image on an image sensor. The image sensor may convert the optical image into sensor data. The image sensor or a data processor may provide image data from the sensor data. The first boundary may correspond to a first sensor portion of the image sensor, and the second boundary may correspond to a second sensor portion of the image sensor. The first sensor portion and/or the second sensor portion may be substantially smaller than the active area of the image sensor. In an embodiment, data obtained from detector pixels outside the first sensor portion may be substantially discarded during the first time period, and data obtained from detector pixels outside the second sensor portion may be substantially discarded during the second time period.

In an embodiment, the user does not need to change the mechanical orientation of the camera during recording the video sequence.

In an embodiment, the user does not accurately adjust the mechanical orientation of the camera prior to recording the video sequence. The recorded video images may be rapidly and accurately framed also without using a mechanically adjustable tripod. Thus, the camera may also be positioned e.g. on nearly any support which happens to be available. For example, a table or a branch of a tree may be used as a support for the camera when recording the video sequence.

In an embodiment, the user does not change the orientation of the camera during recording the video sequence. The recorded video images may be rapidly and accurately framed also without a need to use a tripod with a mechanically turning head. Thus, the camera may also be positioned e.g. on nearly any support which happens to be available. For example, a table or a branch of a tree may be used as a support for the camera when recording the video sequence.

In an embodiment, the user does not need to support the camera manually during recording the video sequence. In particular, the user does not need to manually support and aim the camera during recording the video sequence. Thus there is no need to use an optical stabilizer to reduce the effect of mechanical shaking on the video images.

An optical stabilizer may sometimes unintentionally compensate the mechanical movement of a camera also in a situation where the user intentionally changes the orientation of the camera in order to aim the camera at the object of interest. This undesired compensating effect of the optical stabilizer may make it more difficult to accurately frame the images of the video sequence in a desired manner. In an embodiment, a transition from a first framing to a second framing may be provided without the disturbing effect of the optical stabilizer, in a situation where the optical stabilizer is used to reduce shaking.

In an embodiment, only sensor data from a small sensor area needs to be processed. Thus, data processing may be carried out at a reduced rate. The memory space needed for storing the video sequence may be reduced and/or the image data may be processed at a lower speed.

When using a touch screen, the video script may be created by fast and intuitive gestures. The boundaries may be drawn one by one. The size of the boundaries may be changed e.g. by pinching.

Once the video script has been created, the recording of the video sequence according to the video script may be started e.g. by pressing a button or by touching a virtual key. The user does not need to move the camera during the recording. The camera may be kept substantially steady by free hand or by using a support, e.g. a tripod.

BRIEF DESCRIPTION OF THE DRAWINGS

In the following examples, various embodiments will be described in more detail with reference to the appended drawings of example embodiments, in which FIG. 11a shows a portable imaging device comprising a communication module, FIG. 11b shows a remote control device for the camera, FIG. 11c shows a server for storing a video sequence.

DETAILED DESCRIPTION

Figure 1:
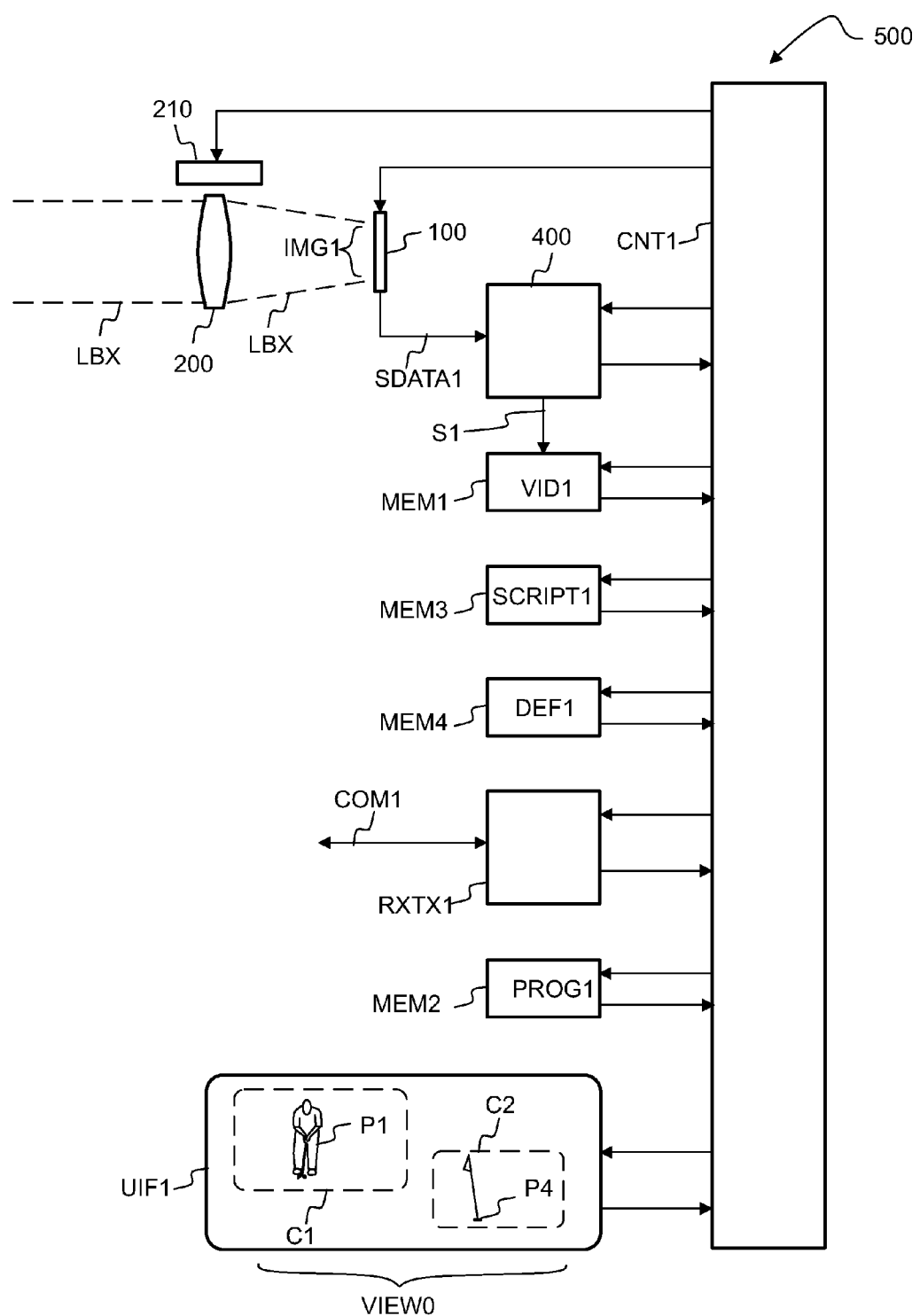
FIG. 1 shows units of a camera.

Referring to FIG. 1, an imaging unit 500 may comprise imaging optics 200 for focusing light LBX to an image sensor 100. The imaging unit 500 may be called e.g. as a camera or as a camera unit. The imaging optics 200 may form an optical image IMG1 on the image sensor 100. Sensor data SDATA1 obtained from the image sensor 100 may be processed by one or more data processors 400 to provide image frames. The image frames of a recorded video sequence VID1 may be stored in a memory MEM1. The video sequence VID1 may comprise a first video shot S1 and a second video shot S2. Each video shot S1, S2 may comprise several image frames. At least one of the objects shown in the video sequence VID1 may be moving during recording the video sequence VID1. Displaying the image frames in the consecutive order may create an impression of a moving object.

The framing of the first video shot S1 may be determined according to a first boundary C1, and the framing of the second video shot S2 may be determined according to a second boundary C2. The first video shot S1 may show an object, which does not appear in the second shot S2. The second video shot S2 may show an object, which does not appear in the first shot S1. P1 denotes an image of a first object (e.g. a person playing golf). P4 denotes an image of a further object (e.g. a golf hole).

The camera 500 may comprise a user interface UIF1 for displaying images, and for receiving instructions from a user. A video script for recording the video sequence may be created by using the user interface UIF1.

The operation of the camera 500 may be controlled by a control unit CNT1. The control unit CNT1 may comprise one or more data processors. The control unit CNT1 may comprise one or more data processors 400 and/or the control unit CNT1 may be configured to control operation of one or more data processors 400. The camera 500 or an apparatus comprising the camera 500 may comprise a memory MEM1, one or more processors 400, CNT1, and computer program code PROG1 residing in the memory MEM2 for implementing, for example, the functionalities of a software application like a script creation or an application for sending video data VID1 and receiving a video script SCRIPT1.

The image frames of the recorded video sequence VID1 may be stored in the memory MEM1. The camera 500 may be configured to store a first image frame and a second image frame of the video sequence VID1 in the memory MEM1. The camera 500 may be configured to store substantially all image frames of the video sequence VID1 in the memory MEM1. The memory MEM1 may be local, or the memory MEM1 may be connected to a data processor 400 via a network.

The camera 500 may comprise a script memory MEM3 for storing a video script SCRIPT1. The script SCRIPT1 may comprise a set of parameters, which define framing as a function of time, for recording the video sequence VID1. The video script SCRIPT1 may comprise e.g. a set of parameters, which define the stop time of a video shot S1, the location of a sensor portion POR1 used for recording the video shot S1, and the size of the sensor portion POR1.

The user interface UIF1 may comprise e.g. a touch screen for visually displaying information and for receiving commands from a user. The video script SCRPT1 may be created by using the touch screen. In particular, a preview image VIEW0 may be displayed on the touch screen, and the position of a first boundary C1 and the position of a second boundary C2 may be defined by using the touch screen.

The user interface UIF1 may comprise hardware, e.g. a display, keypad and/or a touch screen. The user interface may comprise a display screen for viewing graphical elements displayed on the screen. The user interface UIF1 may comprise a software application e.g. for displaying various different virtual keys on a touch screen. The user interface UIF1 may comprise one or more virtual keys for receiving instructions from the user. The virtual keys may be implemented on the touch screen. The user interface UIF1 may comprise one or more push buttons for receiving instructions from the user. The user interface UIF1 may comprise a keypad for receiving instructions from the user.

The user interface UIF1 may comprise a display for displaying the preview image VIEW0, The user interface UIF1 may comprise a touchpad, a keypad, a mouse and/or a joystick for receiving instructions from the user. The first boundary and the second boundary may be defined by using the touch pad, keypad, mouse and/or joystick.

The first boundary C1 and/or the second boundary C2 may be displayed on a display, e.g. on a touch screen. In an embodiment, the boundary C1, C2 may be displayed e.g. as a substantially rectangular borderline, wherein the size of the area enclosed by the borderline may correspond to the framing of the corresponding video shot S1, S2. In an embodiment, the position of a boundary C1, C2 may be displayed e.g. as a dot or a cross superposed on the preview image VIEW0, without displaying the borderline.

In an embodiment, the user interface UIF1 may comprise a microphone and a speech recognition unit for receiving instructions, which are spoken aloud. For example, the user may define the position of the first boundary by saying e.g. "left", "center" or "right".

In an embodiment, the user interface UIF1 may be configured to receive verbal instructions, which define the position of the first boundary and which may also define the operating mode of the camera during recording the video sequence VID1. The user may say e.g. "track the ball" in order to define the position of the first boundary and in order to define the tracking mode. The expression "track the ball" may be interpreted to comprise a first instruction, which defines the position of the first boundary, and a second instruction, which defines the operating mode. The camera may execute the verbal instruction "track the ball" by setting the position of the first boundary so that the first boundary encloses a sub-image of a ball appearing in the preview image VIEW0. Furthermore, the framing may be configured to track the movements of the ball during recording the video sequence VID1, according to the verbal instruction "track the ball". The camera 500 may comprise an image recognition unit for analyzing the preview image. The image recognition unit may be configured to recognize the position of a specified sub-image appearing in a larger image VIEW0, IMG1. The image recognition unit may be configured to determine the position of a specified sub-image appearing in a larger image VIEW0, IMG1.

The speech recognition unit and/or the image recognition unit may be implemented by using one or more data processors.

The camera 500 or a second device communicating with the camera 500 may comprise the user interface UIF1. The user interface UIF1 may be implemented e.g. in a portable device, e.g. in a smart phone. A user may receive information via the interface UIF1. The user may control operation of the camera 500 and/or the system 1000 by giving commands via the user interface UIF1. In an embodiment, the user interface UIF1 and the image sensor 100 may be implemented in the same housing. In an embodiment, the image sensor 100 and the user interface UIF1 may be implemented in separate housings. The user interface UIF1 may be remote from the image sensor 100.

The camera 500 may comprise a program memory MEM2 for storing computer program code PROG1. The computer program code PROG1 may be configured to, when executed on at least one processor CNT1, 400, cause the camera 500 to receive a first instruction, which defines the position of a first boundary with respect to a preview image, and to receive a second instruction, which defines the position of a second boundary with respect to the preview image, a framing path, or a tracking mode. The computer program code PROG1 may be configured to, when executed on at least one processor CNT1, 400, cause the camera 500 to cause the camera 500 to record the video sequence VID1 according to the boundaries C1, C2.

The computer program code PROG1 may be configured to, when executed on at least one processor, cause an apparatus or a system to:
  receive a first instruction, which defines the position of a first boundary with respect to a preview image,
  receive a second instruction, which defines the position of a second boundary with respect to the preview image, a framing path, or a tracking mode,
  determine the position of a first sensor portion according to the position of the first boundary,
  determine the position of a second sensor portion according to the second instruction,
  provide first sensor data by forming a first optical image on an image sensor after receiving the second instruction,
  provide second sensor data by forming a second optical image on the image sensor after the first optical image has been formed,
  determine a first image frame from the first sensor data obtained from the first sensor portion,
  determine a second image frame from the second sensor data obtained from the second sensor portion, and/or
  store and/or transmit the first image frame and the second image frame.

The camera 500 may comprise a communication unit RXTX1 for communicating data. The communication unit RXTX1 may send and/or receive data signals COM1. In particular, the video sequence recorded by the camera 500 may be transmitted to the Internet or via a mobile communications network by using the communication unit RXTX1.

The camera 500 may be a portable device.

The camera may comprise a focusing actuator 210.

The camera 500 may comprise a memory MEM4 for storing one or more parameters DEF1, which define the default settings, e.g. the default duration of a video sequence VID1. In an embodiment, one or more of said parameters DEF1 may also be retrieved from an external memory via a network.

Figure 2:
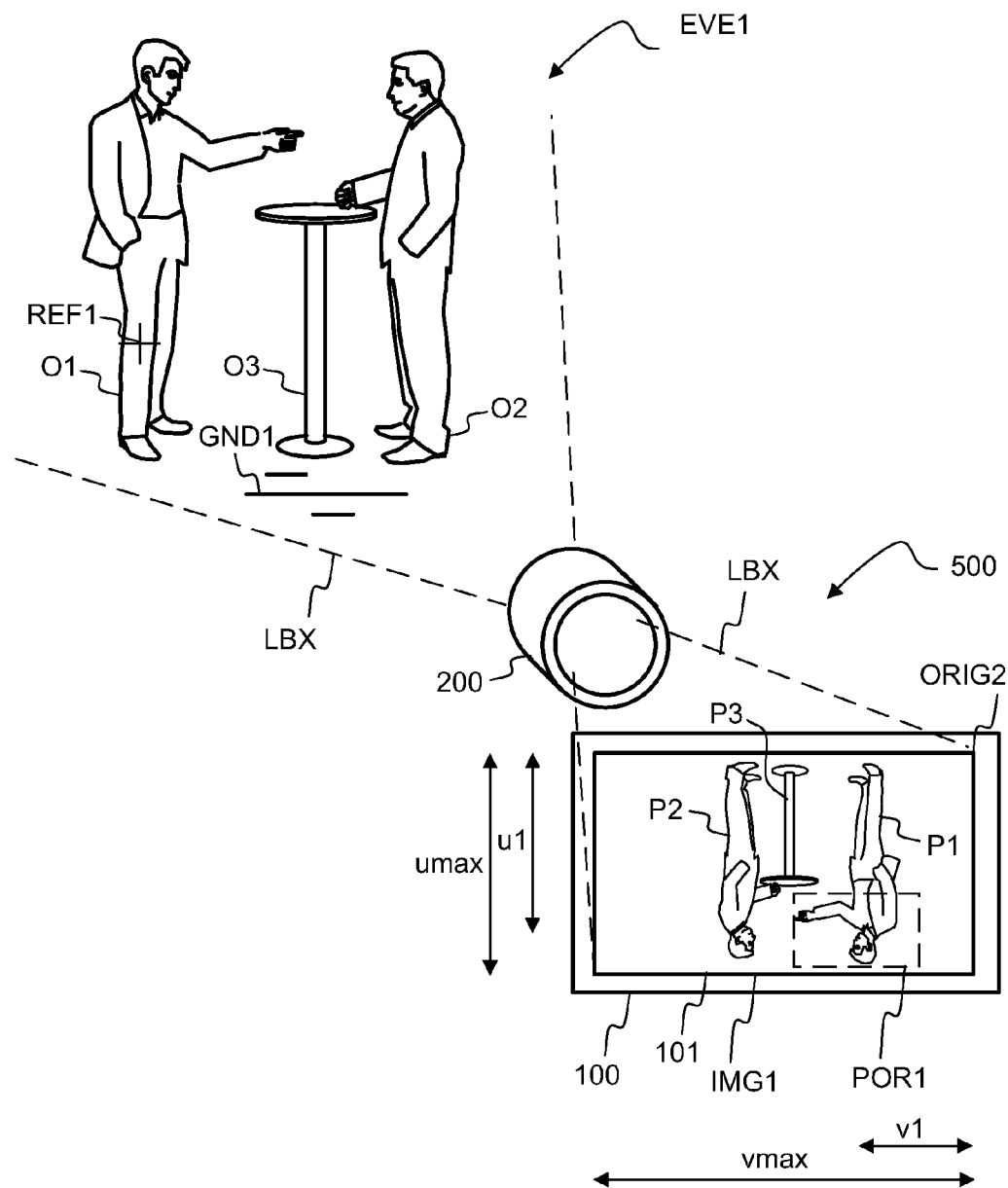
FIG. 2 shows, in a three dimensional view, forming an image of an object on the image sensor of a camera.

Referring to FIG. 2, the camera 500 may be used to record a video sequence VID1 of an event EVE1. One or more objects O1, O2, O3 may be moving during the event. The optics 200 of the camera 500 may form an optical image IMG1 on the active area 101 of the image sensor 100. The optics 200 may form an image P1 of a first object O1, an image P2 of a second object, and an image P3 of a third object O3.

The image IMG1 may comprise the images P1, P2, P3. The images P1, P2, P3 may also be called as sub-images or as partial images.

The sub-images P1, P2, P3 may also be called as the "objects", in order to simplify verbal expressions. For example, the expression "the recorded video sequence VID1 shows an "object" P1 means that the recorded video sequence VID1 shows a sub-image P1 of an object O1.

The image sensor 100 may comprise a two-dimensional array of light-detecting detector pixels, which cover the active area 101 of the image sensor 100. The image sensor 100 may convert the optical image IMG1 into a digital image. The image sensor 100 may comprise e.g. a CMOS array or a CCD array.

The control unit CNT1 of the camera 500 may be arranged to define a sensor portion POR1 of the of the image sensor 100. The control unit CNT1 may be arranged to define the sensor portion POR1 according to the boundary C1. The user may define the size and/or position of the boundary C1 e.g. by using a touch screen. The sensor portion POR1 may correspond to the boundary C1. The control unit CNT1 may define the size and/or position of the sensor portion POR1 according to the size and/or position of the boundary C1. The position of the sensor portion POR1 may be defined e.g. by the coordinates u1, v1. The coordinate u1 may denote e.g. the horizontal distance between an origin ORIG2 and the center of the sensor portion POR1. The coordinate v1 may denote e.g. the vertical distance between the origin ORIG2 and the center of the sensor portion. The active area 101 of the image sensor 100 may have a width umax and a height vmax.

In an embodiment, the area of the sensor portion POR1 may be e.g. smaller than 50% of the active area 101 of the image sensor 100. In an embodiment, the width of the sensor portion POR1 may be e.g. smaller than 50% of the width vmax of the active area 101.

In an embodiment, the active area 101 of the image sensor 100 of the camera 500 may comprise e.g. more than $40 \cdot 10^6$ detector pixels. The pixels may be arranged e.g. in a two-dimensional rectangular array comprising 7728×5368 pixels. Said camera 500 may have a first operating mode where the aspect ratio of the recorded image frames is 4:3, wherein the active area 101 may consist of 7152×5368 detector pixels. In this operating mode, the active area may have e.g. $38 \cdot 10^6$ detector pixels. Said camera 500 may also have a second operating mode where the aspect ratio of the recorded image frames is 16:9, wherein the active area 101 may consist of 7728×4354 detector pixels. In this operating mode, the active area may have e.g. $34 \cdot 10^6$ detector pixels.

The image processor 400 may be arranged to determine the pixels of an image frame from the sensor data SDATA1 e.g. by spatial low-pass filtering and/or downsampling.

The pixels of an image frame may also be determined from the sensor data by a technique called as "oversampling", wherein several pixels of the sensor data SDATA1 may be combined to form a single super pixel of an image frame. Thus, the speckled grainy appearance of the image captured in low lighting conditions may be greatly reduced.

In an embodiment, detector pixels of the image sensor 100 may be arranged according to the Bayer matrix, and the sensor data SDATA1 provided by the image sensor 100 may be in the RAW format, i.e. the red values, the green values and the blue values may be associated with slightly different spatial positions. The image processor 400 may be arranged to determine image data from the sensor data SDATA1 by using a de-mosaic algorithm, wherein the red value, the green value and the blue value of a pixel of the image data may be associated with the same spatial position.

One or more of the objects O1, O2, O3 may move with respect to a reference point REF1 during capturing the video. The reference point REF1 may be fixed e.g. to one of the objects O1, O2, O3 or to the ground GND1.

Figure 3A:
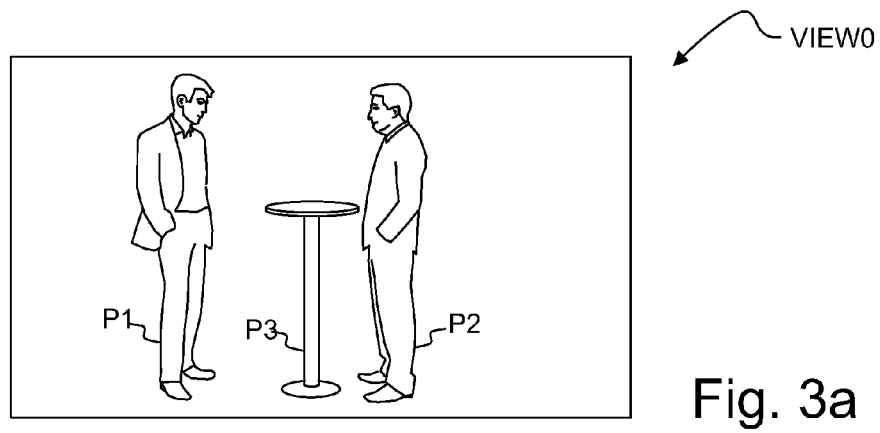
FIG. 3a shows a preview image of the object.

FIG. 3a shows a preview image VIEW0 comprising sub-images P1, P2, P3. The sub-image P1 may be e.g. the image of a first person. The second sub-image P2 may be e.g. the image of a second person. The sub-image P3 may be e.g. the image of a background object, e.g. the image of a table. The preview image IMG1 may be captured e.g. by using the same image sensor 100 of the camera 500, which will be used for capturing the video sequence VID1. However, also a different image sensor may be used for capturing the preview image VIEW0.

Figure 3B:
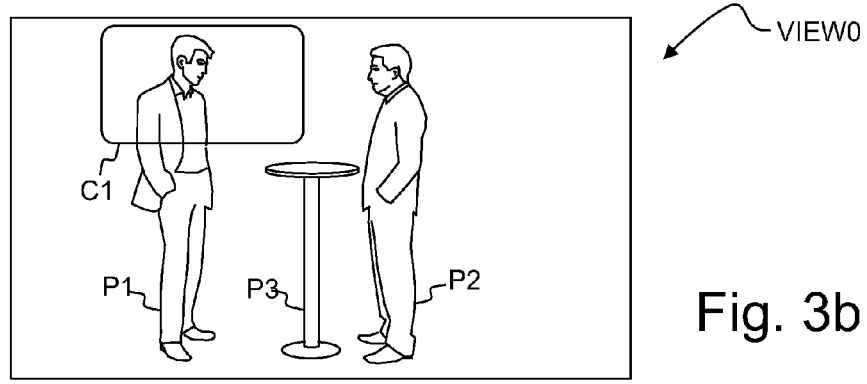
FIG. 3b shows the position of a first boundary with respect to the preview image.

Referring to FIG. 3b, a user of the camera 500 may define a first boundary C1. The position and/or the size of the first boundary C1 may be defined with respect to the preview image IMG1. The preview image VIEW0 may be displayed e.g. on a touch screen, and the user may define the position and size of the first boundary C1 by using the touch screen.

The size of the boundary means the size of the area enclosed by said boundary.

Figure 3C:
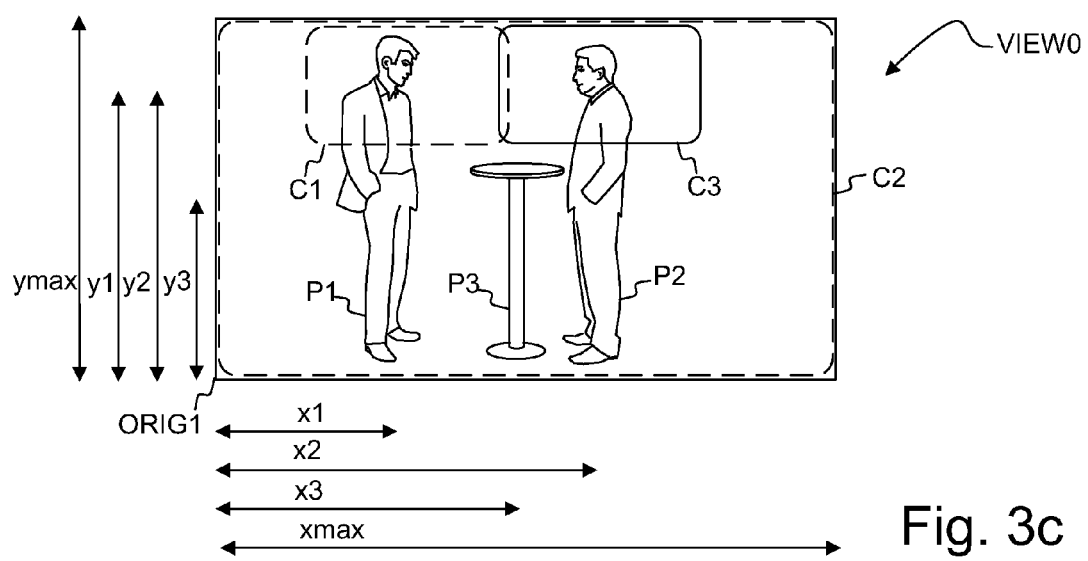
FIG. 3c shows the position of a second boundary with respect to the preview image, and the position of a third boundary with respect to the preview image.

Referring to FIG. 3c, the user may define a second boundary C2. The position and/or the size of the second boundary C2 may be defined with respect to the first boundary C1. The second boundary C2 may be displaced with respect to the first boundary C1 and/or the size of the second boundary C2 may be different from the size of the first boundary C1.

The user may also define a third boundary C3. The position and/or the size of the second boundary C3 may be defined with respect to the first boundary C1.

In this example, the first boundary C1 may enclose e.g. a part of the sub-image P1 of the first person such that the first boundary C1 does not enclose a part of the image P2 of the second person. The second boundary C2 may enclose substantially the whole preview image VIEW0. The third boundary C3 may enclose a part of the sub-image P2 of the second person.

The aspect ratio of the boundary C1, C2, C3 may be substantially equal to the aspect ratio of the preview image VIEW0. The aspect ratio refers to the ratio of the width of an item to the height of said item.

The position of the first boundary C1 with respect to the preview image VIEW0 may be defined e.g. by the coordinates x1, y1. The coordinate x1 may denote e.g. the horizontal distance between an origin ORIG1 and the center of the first boundary C1. The origin ORIG1 may be e.g. at a corner of the preview image VIEW0. The coordinate y1 may denote e.g. the vertical distance between the origin ORIG1 and the center of the first boundary C1. The preview image VIEW0 may have a width xmax and a height ymax.

The position of the second boundary C2 with respect to the preview image VIEW0 may be defined e.g. by the coordinates x2, y2. The coordinate x2 may denote e.g. the horizontal distance between the origin ORIG1 and the center of the second boundary C2. The coordinate y2 may denote e.g. the vertical distance between the origin ORIG1 and the center of the second boundary C2.

The position of the third boundary C3 with respect to the preview image VIEW0 may be defined e.g. by the coordinates x3, y3. The coordinate x3 may denote e.g. the horizontal distance between the origin ORIG1 and the center of the third boundary C3. The coordinate y3 may denote e.g. the vertical distance between the origin ORIG1 and the center of the third boundary C3.

The position and/or size of one or more boundaries C1, C2, C3 may be selected by using the user interface UIF1.

The user may provide a first instruction, which defines the position of the first boundary C1. The user may provide a second instruction, which defines the position of the second boundary C2.

Figure 4A:
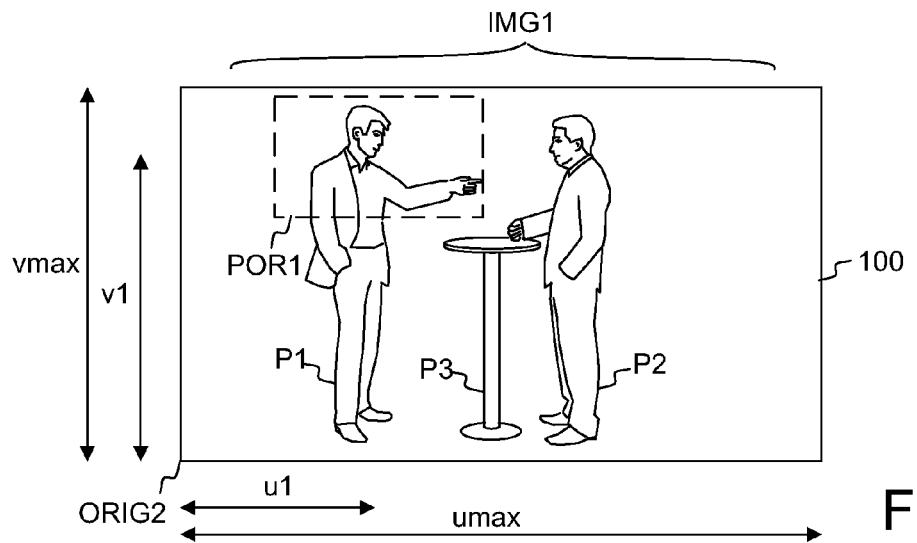
FIG. 4a shows a first sensor portion with respect to a first optical image formed on the image sensor.

Referring to FIG. 4a, the first boundary C1 may correspond to a first sensor portion POR1 of the image sensor 100. The camera 500 may be arranged to operate such that the size and position of the first boundary C1 with respect to the preview image VIEW0 defines the size and position of the first portion POR1 with respect to the image sensor 100.

The position of the first sensor portion POR1 with respect to the image sensor 100 may be defined e.g. by the coordinates u1, v1. The coordinate u1 may denote e.g. the horizontal distance between an origin ORIG2 and the center of the first portion POR1. The origin ORIG2 may be e.g. at a corner of the active area 101. The coordinate v1 may denote e.g. the vertical distance between the origin ORIG2 and the center of the first sensor portion POR1. The active area 101 may have a width xmax and a height ymax. The optical image IMG1 formed on the active area 101 may have a width xmax and a height ymax.

The control unit CNT1 may be arranged to set the position (u1,v1) of the first sensor portion POR1 so that the position coordinate u1 substantially satisfies the equation u1/umax=x1/xmax, and so that the position coordinate v1 substantially satisfies the equation v1/vmax=y1/ymax.

Figure 4B:
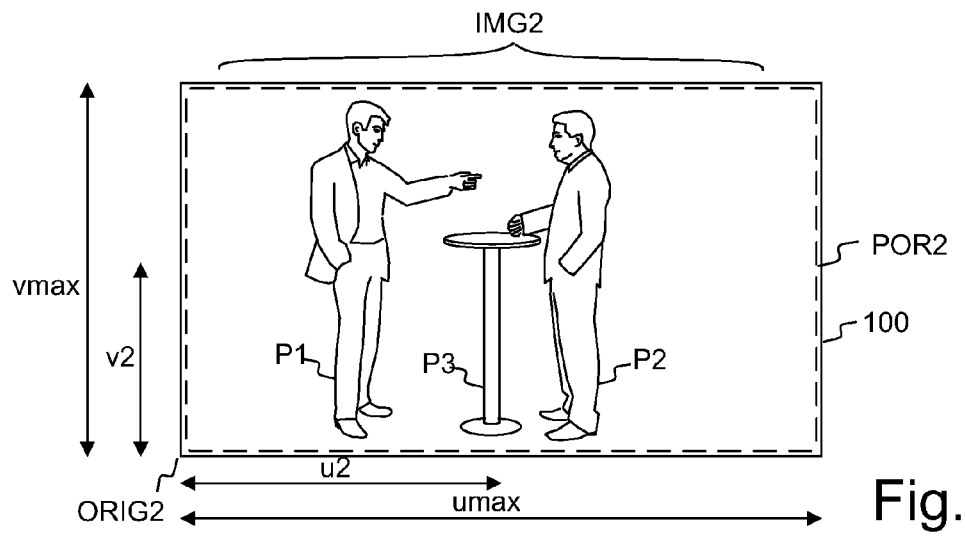
FIG. 4b shows a second sensor portion respect to a second optical image formed on the image sensor.

Referring to FIG. 4b, the second boundary C2 may correspond to a second sensor portion POR2 of the image sensor 100. The camera 500 may be arranged to operate such that the size and position of the second boundary C2 with respect to the preview image VIEW0 defines the size and position of the second portion POR2 with respect to the image sensor 100.

The position of the second sensor portion POR2 with respect to the image sensor 100 may be defined e.g. by the coordinates u2, v2. The coordinate u2 may denote e.g. the horizontal distance between the origin ORIG2 and the center of the second portion POR2. The coordinate v2 may denote e.g. the vertical distance between the origin ORIG2 and the center of the second sensor portion POR2.

The control unit CNT1 may be arranged to set the position (u2,v2) of the second sensor portion POR2 so that the position coordinate u2 substantially satisfies the equation u2/umax=x2/xmax, and so that the position coordinate v2 substantially satisfies the equation v2/vmax=y2/ymax.

Figure 4C:
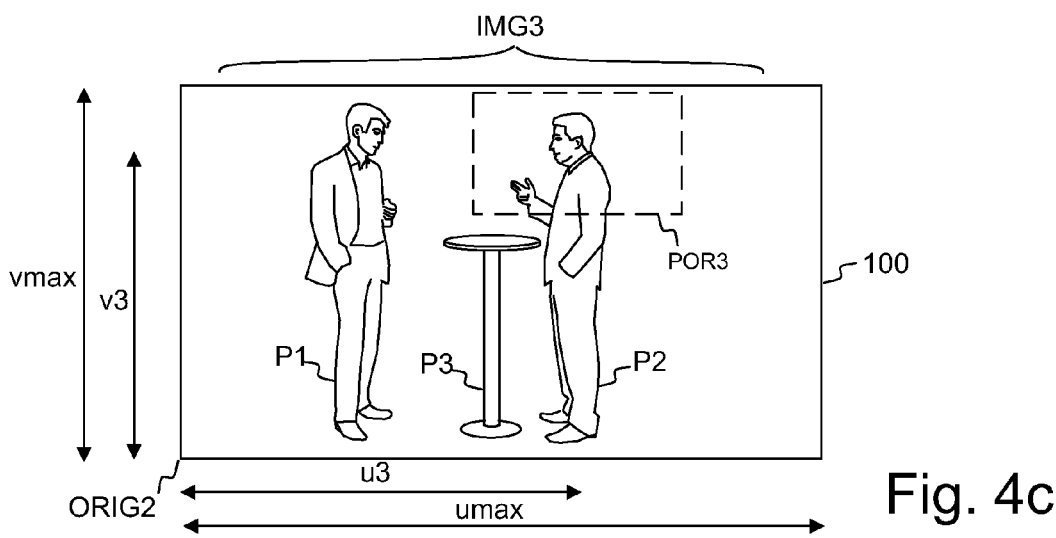
FIG. 4c shows a third sensor portion respect to a third optical image formed on the image sensor.

Referring to FIG. 4c, the third boundary C3 may correspond to a third sensor portion POR3 of the image sensor 100. The camera 500 may be arranged to operate such that the size and position of the third boundary C3 with respect to the preview image VIEW0 defines the size and position of the third portion POR3 with respect to the image sensor 100.

The position of the third sensor portion POR3 with respect to the image sensor 100 may be defined e.g. by the coordinates u3, v3. The coordinate u3 may denote e.g. the horizontal distance between the origin ORIG2 and the center of the third portion POR3. The coordinate v3 may denote e.g. the vertical distance between the origin ORIG2 and the center of the third sensor portion POR3.

The control unit CNT1 may be arranged to set the position (u3,v3) of the third sensor portion POR3 so that the position coordinate u3 substantially satisfies the equation u3/umax=x3/xmax, and so that the position coordinate v3 substantially satisfies the equation v3/vmax=y3/ymax.

The positions of the sensor portions POR1, POR2, POR3 with respect to the image sensor 100 may substantially correspond to the positions of the boundaries C1, C2, C3 with respect to the preview image VIEW0. The video sequence VID1 may be recorded such that different sensor portion are applied during successive time periods.

During a first time period, an optical image IMG1 may be formed on the image sensor 100, and the image sensor 100 may convert the optical image IMG1 into first sensor data. The optical image IMG1 may be formed after the C1, C2, C3 have been defined. A first image frame may be determined from the first sensor data based on the first boundary C1. Sensor data provided by detector pixels outside the first sensor portion POR1 may be substantially discarded. The first image frame may mainly represent sensor data obtained from the first sensor portion POR1. In this context, the term "mainly" may mean e.g. that at least 90% of the image data contained in the first image frame may be based on sensor data obtained from the first sensor portion POR1. Less than 10% of the image data contained in the first image frame may be based on sensor data obtained from outside the first sensor portion POR1, respectively. The first image frame may be subsequently stored in the memory MEM1. A first video shot S1 of the recorded video sequence VID1 may comprise several image frames, including said first image frame. The image frames of the shot S1 may be recorded by using the same sensor portion POR1.

During a second time period, an optical image IMG2 may be formed on the image sensor 100, and the image sensor 100 may convert the optical image IMG2 into second sensor data. A second image frame may be determined from the second sensor data based on the second boundary C2. Sensor data provided by detector pixels outside the second sensor portion POR2 may be substantially discarded. The second image frame may mainly represent sensor data obtained from the second sensor portion POR2. For example, at least 90% of the image data contained in the second image frame may be based on sensor data obtained from the second sensor portion POR2. The second image frame may be subsequently stored in the memory MEM1. A second video shot S2 of the recorded video sequence VID1 may comprise several image frames, including said second image frame. The image frames of the shot S2 may be recorded by using the same sensor portion POR2.

During a third time period, an optical image IMG3 may be formed on the image sensor 100, and the image sensor 100 may convert the optical image IMG3 into third sensor data. A third image frame may be determined from the third sensor data based on the third boundary C3. Sensor data provided by detector pixels outside the third sensor portion POR3 may be substantially discarded. The third image frame may mainly represent sensor data obtained from the third sensor portion POR3. For example, at least 90% of the image data contained in the third image frame may be based on sensor data obtained from the third sensor portion POR3. The third image frame may be subsequently stored in the memory MEM1. A third video shot S3 of the recorded video sequence VID1 may comprise several image frames, including said third image frame. The image frames of the shot S3 may be recorded by using the same sensor portion POR3.

The image frames may be determined from the sensor data such that each image frame may have substantially the same resolution even when they were recorded by using sensor portions of different sizes. A first image frame determined from sensor data obtained from the first sensor portion POR1 may have substantially the same resolution as a second image frame determined from sensor data obtained from the second sensor portion POR2.

The second portion POR2 may be applied after using the first portion POR1. The third portion POR3 may be applied after using the second portion POR2.

The second boundary C2 may be displaced with respect to the first boundary C1. The first sensor portion POR1 may correspond to the first boundary C1. The second sensor portion POR2 may correspond to the second boundary C2. Thus, the second sensor portion POR2 may be displaced with respect to the first sensor portion POR1. In an embodiment, the second boundary C2 may be displaced with respect to the first boundary C1 so that the second boundary C2 does not overlap the first boundary C1. The second sensor portion POR2 may be displaced with respect to the first sensor portion POR1 so that the second sensor portion does not overlap the first sensor portion POR1.

The third boundary C3 may be displaced with respect to the first boundary C1 and/or with respect to the second boundary C2. The third sensor portion POR3 may be displaced with respect to the first sensor portion POR1 and/or with respect to the second sensor portion POR2, respectively. Defining the third boundary is optional. Defining the second boundary C2 may be omitted when defining a framing path or a tracking mode.

The portion of the preview image VIEW0 enclosed by the first boundary C1 may be substantially smaller than the whole preview image VIEW0. The area enclosed by the first boundary C1 may be e.g. smaller than 70% of the whole area of the preview image VIEW0. The area enclosed by the first boundary C1 may be e.g. in the range of 10% to 50% of the whole area of the preview image VIEW0.

The area of the first sensor portion POR1 may be substantially smaller than the active area 101 of the image sensor 100. The area of the first sensor portion POR1 may be smaller than 70% of the active area 101 of the image sensor 100. The area of the first sensor portion POR1 may be e.g. in the range of 10% to 50% of the active area 101 of the sensor 100.

The center of the second sensor portion POR2 may be displaced with respect to the center of the second sensor portion POR1. The displacement may be e.g. greater than 10% of the width (umax) of the active area 101 of the image sensor 100.

Figure 5A:
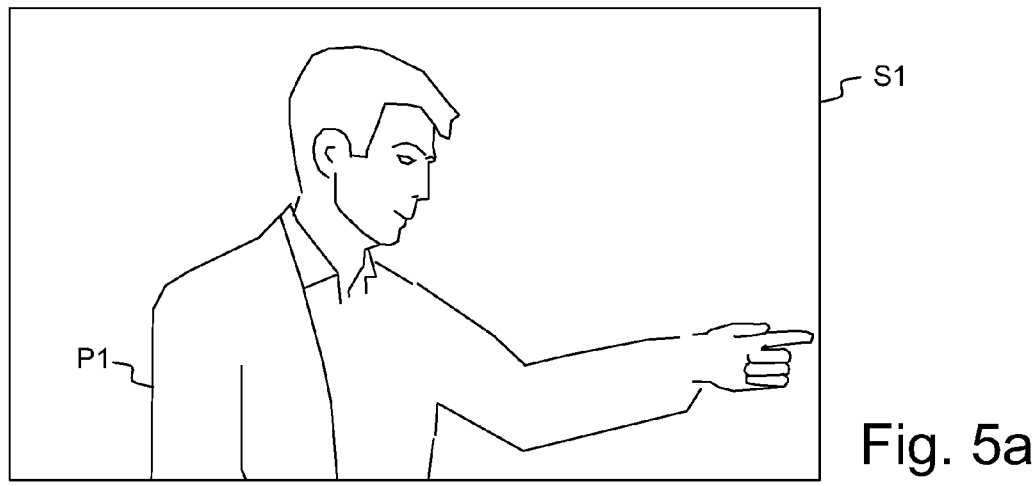
FIG. 5a shows a first video shot of a video sequence.
Figure 5B:
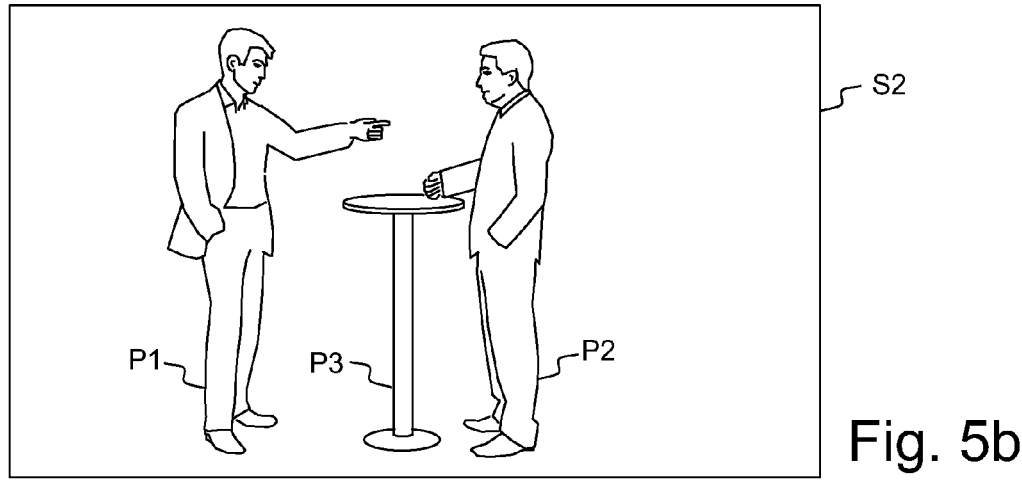
FIG. 5b shows a second video shot of the video sequence.
Figure 5C:
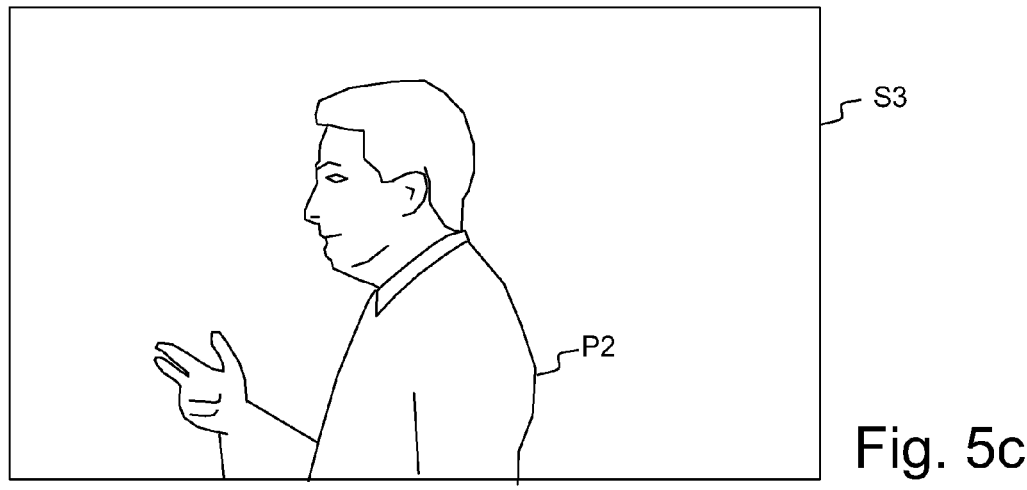
FIG. 5c shows a third video shot of the video sequence.

FIGS. 5a to 5c show image frames of video shots S1, S2, S3 of a video sequence VID1. FIGS. 5a to 5c illustrate the contents of the video sequence VID1 captured and stored in the memory based on the boundaries C1, C2, C3. Each video shot S1, S2, S3 of the video sequence VID1 may comprise several different image frames. Displaying the image frames in consecutive order may create an impression of moving objects.

Sensor data obtained from the first sensor POR1 portion during a first time period may be processed to provide a first video shot S1 of the video sequence VID1, and sensor data obtained from the second sensor portion POR2 during a second time period may be processed to provide a second video shot S2 of the video sequence VID1.

FIG. 5a shows the image frame of the video shot S1, which was recorded by using the sensor portion POR1 of FIG. 4a. FIG. 5b shows the image frame of the video shot S2, which was recorded by using the sensor portion POR2 of FIG. 4b. FIG. 5c shows the image frame of the video shot S3, which was recorded by using the sensor portion POR3 of FIG. 4c.

The image frame shown in FIG. 5a may be called as the first image frame, the image frame shown in FIG. 5b may be called as the second image frame, and the image frame shown in FIG. 5c may be called as the third image frame. The first image frame may show e.g. a close-up view of a first person P1. The second image frame may show e.g. a wide-angle view of the first person P1 and the second person P2, and the third image frame may show e.g. a close-up view of the second person P2. The first image frame, the second image frame, and the third image frame are captured at different times. The image frames shown in FIGS. 5a to 5c are captured after capturing the preview image VIEW0. For example, the sub-image P1 appearing in FIG. 5a may have moved when compared with the sub-image P1 appearing in the preview image VIEW0 of FIG. 3a. For example, the sub-image P2 appearing in FIG. 5c may have moved when compared with the sub-image P2 appearing in FIG. 5b.

The time period between capturing the preview image VIEW0 and capturing the first image frame of the video sequence VID1 may be e.g. in the range of 1 second to 1 hour. The duration of the video sequence VID1 may be e.g. in the range of 1 second to 10 days.

The image frames shown in FIGS. 5a to 5c are captured after defining the boundaries C1, C2, C3.

The video shots S1, S2, S3 shown in FIGS. 5a to 5c may be recorded substantially without changing the orientation of the camera 500 during the recording. Furthermore, the user does not need to provide zooming instructions during the recording. Thus, unintentional shaking may be substantially avoided.

In an embodiment, one of the persons P1, P2 appearing the video sequence VID1 may also be the user of the camera 500.

FIGS. 6a to 7b show, by way of example, how a video script may be created by using a touch screen of the user interface UIF1.

Creating the video script may comprise defining the position of at least one boundary C1, C2 with respect to a feature appearing in the preview image VIEW0. The preview image VIEW0 may be captured by using the camera 500. When the intention is to record a video sequence VID1 of an event EVE1 where an object O1 will be moving, the sub-image P1 of the same object O1 may also appear in the preview image VIEW0. Alternatively, a preview image VIEW0 relevant for creating the video script may be retrieved from a memory.

Figure 6A:
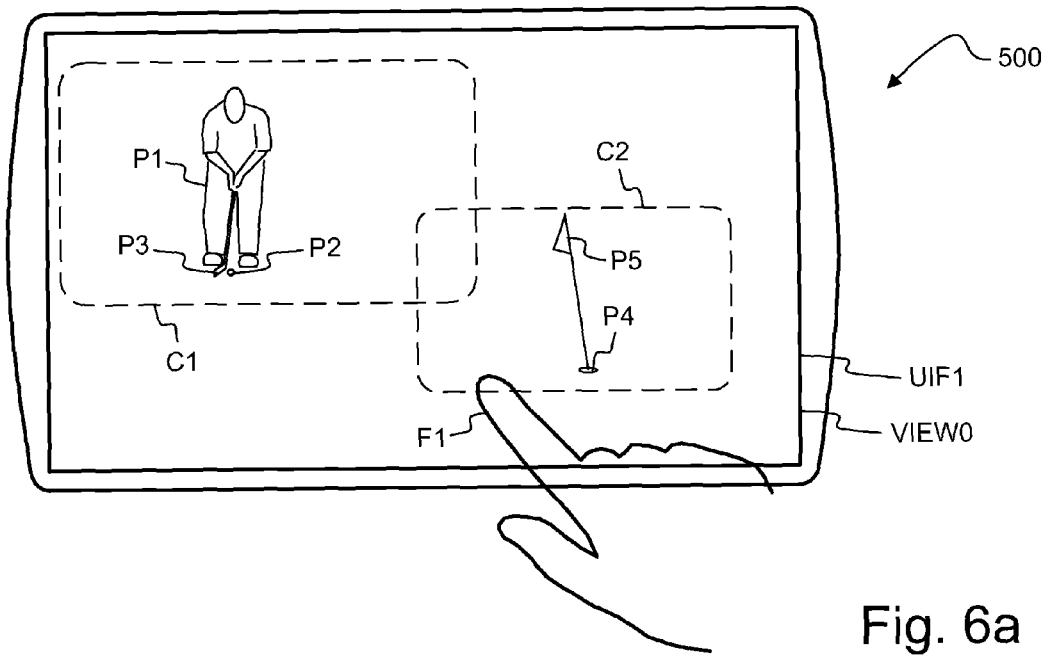
FIG. 6a shows defining a boundary with respect to a preview image.

Referring to FIG. 6a, the location of a boundary C1, C2 may be defined by using a touch screen. In this example, the first boundary C1 may enclose e.g. a golf player P1, a golf ball P2, and a golf club P3. The second boundary C2 may enclose e.g. a golf hole P4 equipped with a flag P5.

The camera 500 may be first set to a script defining mode by using the user interface, e.g. by touching a virtual key displayed on the screen.

The location of a boundary C1, C2 may be defined e.g. by touching (e.g. by single-tapping or double-tapping) a feature appearing in the preview image VIEW0 so that the camera 500 creates a new boundary C1, C2 and associates the position of the new boundary C1, C2 to the feature, which was indicated by said touching. The camera 500 may associate e.g. the center of the boundary C1, C2 to the feature, which was indicated by the touching. The camera 500 may associate e.g. a predefined corner of the boundary C1, C2 to the feature, which was indicated by the touching. The predefined corner may be e.g. the bottom left corner or the upper left corner.

If desired, the user may adjust the size of the created boundary C1, C2. The newly created boundary C1, C2 may have a default size, which may be used as the starting point for the adjustment. The boundary C1, C2 may be visually displayed on the screen e.g. by showing a substantially rectangular borderline. The size of the boundary C1, C2 may be changed e.g. by touching the screen simultaneously at two touch points, and increasing or decreasing the distance between the two touch points. In particular, at least one of said two touch points may be within an area enclosed by the boundary C1, C2. In particular, the user may make a pinching gesture in order to reduce the size of a boundary C1, C2.

The size of a boundary C1, C2 is related to the zoom level. A large boundary may correspond to a wide angle view (low zoom level). A small boundary may correspond to a close-up view (high zoom level). Changing the size of the boundary C1, C2 will also change the size of the corresponding sensor portion POR1, POR2, which in turn will change the zoom level of the corresponding video shot S1, S2. Increasing the size of a boundary will reduce the zoom level, i.e. it will reduce the height of a sub-image of an object appearing in the video sequence VID1. Decreasing the size of a boundary will increase the zoom level. The size of the boundary C1, C2 may be increased when the intention is to take a wide angle shot. The size of the boundary C1, C2 may be decreased when the intention is to take a close-up shot.

The user may also define the size and position of a boundary C1, C2 e.g. by moving a finger F1 along a substantially closed path on the touch screen.

The position of a boundary may also be changed e.g. by touching the boundary with a finger F1 (or with two fingers), and by dragging the boundary to a desired position.

If the user is not satisfied with the position of a boundary C1, C2, he may delete the boundary C1, C2 e.g. by making a diagonal swiping gesture over the boundary.

As a default, the bottom side of a boundary may be oriented horizontally, even if the closed path drawn by the user would deviate from the horizontal orientation. However, the bottom side of a boundary may also intentionally deviate from the horizontal direction. A boundary may be rotated e.g. by rotating it with two fingers. The bottom side of the corresponding sensor portion may deviate from the horizontal direction such that the recorded image frames are rotated with respect to the horizontal direction, respectively.

Creating a second boundary C2 immediately after the first boundary C1 has been defined may indicate that a second video shot S2 will follow a first video shot S1, wherein the first video shot S1 may be recorder according to the first boundary C1 and the second video shot S2 may be recorded according to the second boundary C2. As a default setting, the framing may immediately jump from the C1 to C2 at the transition between the first video shot S1 and the second video shot S2. The transition between two consecutive shots S1, S2 may be called e.g. as the "scene cut" or as the "scene change".

Figure 6B:
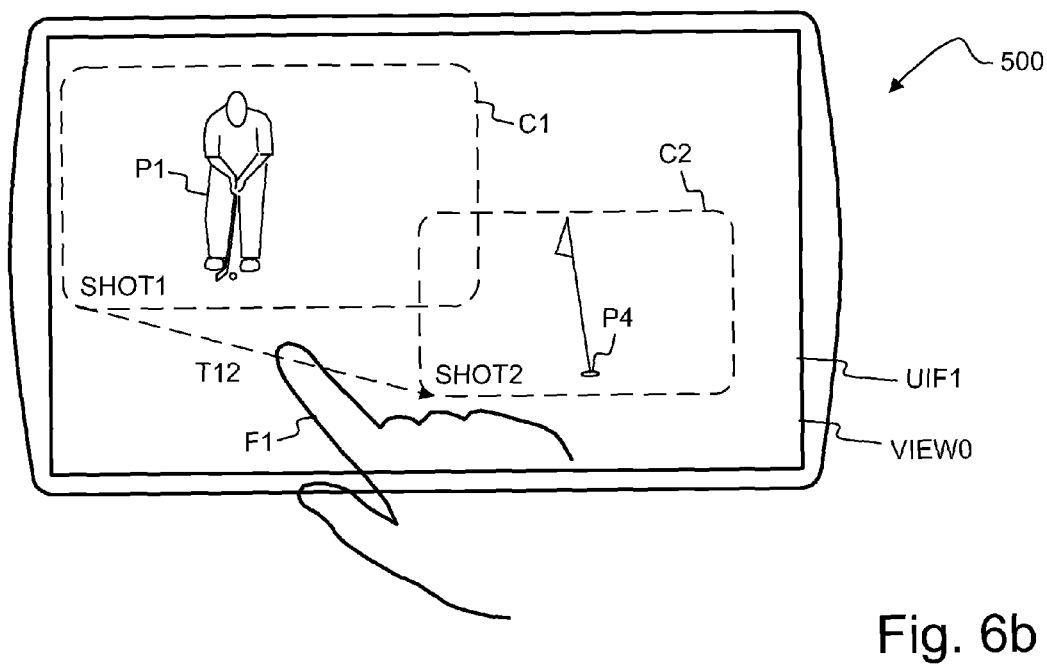
FIG. 6b shows defining a transition from a first video shot to a second video shot.

Referring to FIG. 6b, the user may also create a transition path T12 from a first boundary C1 to a second boundary C2. The transition path T12 may be user-definable. Based on the transition path T12, the camera 500 may be arranged to record a gradual transition from the first video shot S1 to the second video shot S2. In particular, the camera 500 may be arranged to record a panning transition (i.e. scrolling transition) in the direction indicated by the transition path T12. Based on the transition path T12, the camera 500 may record one or more intermediate image frames so as to provide the panning transition from the first framing defined by the boundary C1 to the second framing defined by the boundary C2.

Figure 6C:
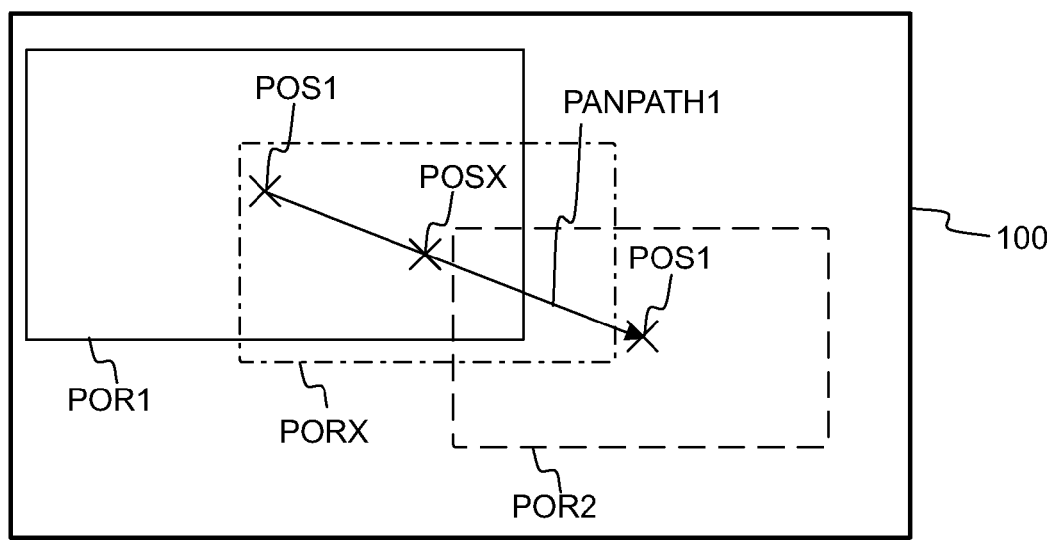
FIG. 6c shows positions of sensor portions on the image sensor.

The first video shot S1 may be recorded during a first time period, and the second video shot S2 may be recorded during a second time period. Referring to FIG. 6c, the method for capturing the video sequence VID1 may comprise defining a transition path T12, which connects the location of the first boundary C1 to the location of the second boundary C2, wherein at least one intermediate image frame may be determined from sensor data obtained from an intermediate sensor portion PORX of the image sensor 100, said sensor data being obtained from the intermediate sensor portion PORX between a first time period and a second time period, and the location POSX of the intermediate sensor portion corresponding to the location of a point on the transition path T12. The intermediate sensor portion may reside between the first sensor portion POR1 and the second sensor portion POR2. The position POSX of the intermediate sensor portion PORX may be located on a line PANPATH1, which connects the first sensor portion POR1 to the second sensor portion POR2. The center of the intermediate sensor portion PORX may be located on a line PANPATH1, which connects the center of the first sensor portion POR1 to the center of the second sensor portion POR2. POS1 may denote the position of the first sensor portion POR1 with respect to the image sensor 100. POS2 may denote the position of the second sensor portion POR2 with respect to the image sensor 100.

When using the touch screen, the transition path T12 may be created e.g. by sliding a touch point from the first boundary C1 to the second boundary C2. In particular, the transition path T12 may be created e.g. by sliding a touch point from a corner of the first boundary C1 to the second boundary C2.

The transition path T12 may be displayed on the screen e.g. by showing a graphical arrow.

A transition between two video shots S1, S2 may be automated. The transition may be determined based on default values and/or the transition may be defined by the user. For example, the user may define the duration of the transition. Also some visual effects may be possible, for example, the panning speed may accelerate and decelerate smoothly during a transition from a first video shot S1 to a second shot S2. A transition between two video shots S1, S2 may comprise changing the zoom level. A transition between two video shots S1, S2 may also comprise a fade-out and a fade-in.

The boundary C1 may be labeled e.g. by displaying a symbol "SHOT1" in order to indicate to the user that the first shot S1 will be recorded according to the (displayed) boundary C1. The boundary C2 may be labeled e.g. by displaying a symbol "SHOT2" in order to indicate to the user that the second shot S2 will be recorded according to the (displayed) boundary C2. The displayed transition path arrow may be labeled e.g. by displaying a symbol "T12" in order to indicate to the user that the transition between the first shot and the second shot will be captured by using the displayed transition path.

Creating a video script SCRIPT1 may comprise defining a boundary and a path for further boundaries. Creating a video script may comprise defining a path, which connects two boundaries. The path does not need to be drawn accurately, because an additional functionality may correct the inaccurate path. In particular, a curved path may be replaced with a linear path. Tapping a point on the path may define an additional boundary. The recorded video sequence may comprise an additional video shot, which is recorded according to the additional boundary.

Figure 6D:
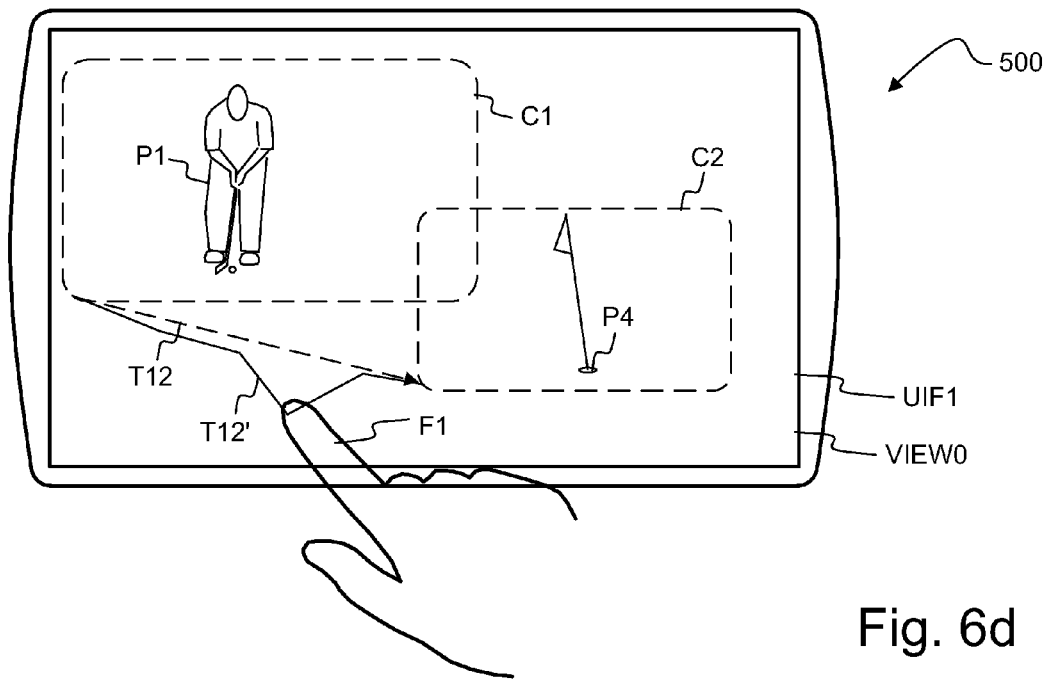
FIG. 6d shows smoothing a transition path.

Referring to FIG. 6d, a trajectory T12' drawn by a sliding a finger F1 on the touch screen may deviate from a straight line. The camera 500 may be arranged to replace a meandering trajectory T12' with a smooth or linear path T12.

Figure 6E:
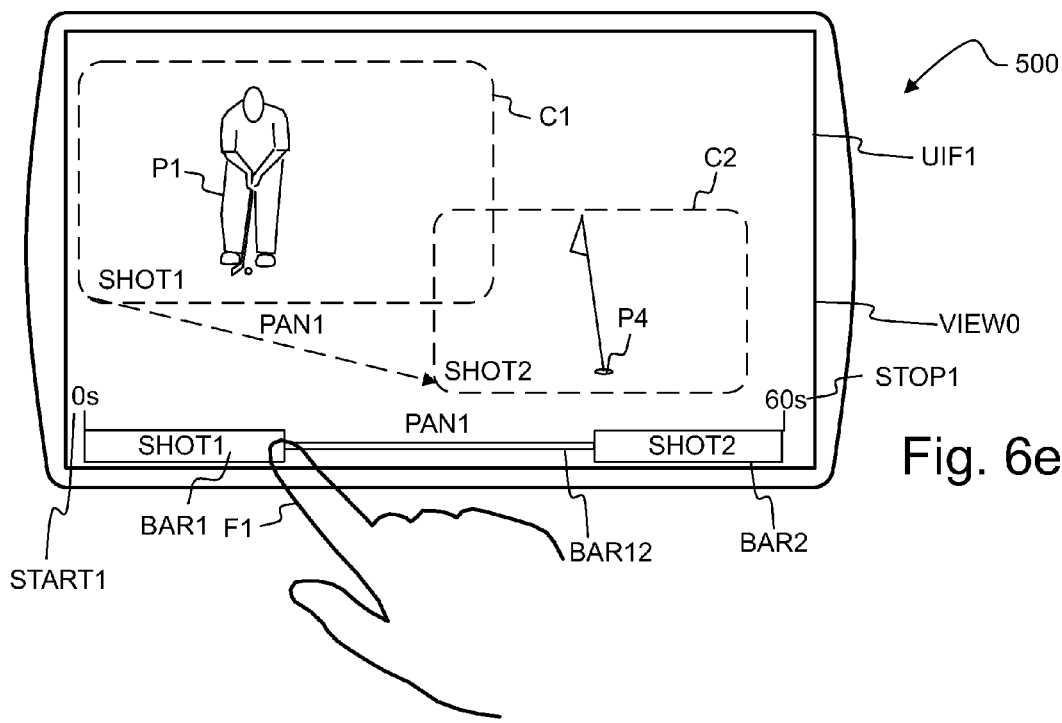
FIG. 6e shows a graphical representation of a video script for two video shots.

Referring to FIG. 6e, a timeline may be displayed on the screen. The timeline may comprise e.g. one or more bars BAR1, PAN1, BAR2. The length of the bar BAR1 may indicate the duration of the first video shot S1, the length of the bar BAR12 may indicate the duration of the transition between the first shot S1 and the second shot S2, and the length of the bar BAR2 may indicate the duration of the second shot S2. A symbol (e.g. SHOT1) may be displayed close to the BAR1 to indicate that the bar BAR1 is associated with the duration of the first shot S1. A symbol (e.g. SHOT1) may be displayed close to the BAR1 to indicate that the bar BAR1 is associated with the duration of the first shot S1. A symbol (e.g. SHOT2) may be displayed close to the BAR2 to indicate that the bar BAR2 is associated with the duration of the second shot S2. A symbol (e.g. PAN1) may be displayed close to the BAR12 to indicate that the bar BAR12 is associated with the duration of the transition between the first shot S1 and the second shot S2. The association between a bar and a boundary may also be indicated e.g. by using colors. For example, the boundary C1 and the bar BAR1 associated with the first shot S1 may be indicated by a first color (e.g. red), and the boundary C2 and the bar BAR2 associated with the second shot S2 may be indicated with a second different color (e.g. yellow).

The start time START1 and/or the stop time STOP1 may be displayed on the screen. The video shots S1, S2 may have default duration and/or the total video sequence VID1 may have default duration. The duration of a video shot or the total duration may be adjusted e.g. by touching an end of a bar displayed on the screen and by sliding the touch point, in order to change the relative length of the bar. The duration of a video shot may be adjusted e.g. so that touching the right end of a bar may increase the relative length of said bar, and touching the left end of the bar may decrease the relative length of said bar.

The user may also define the durations e.g. by giving numerical values, by using a keypad or by using a virtual keypad.

Figure 7A:
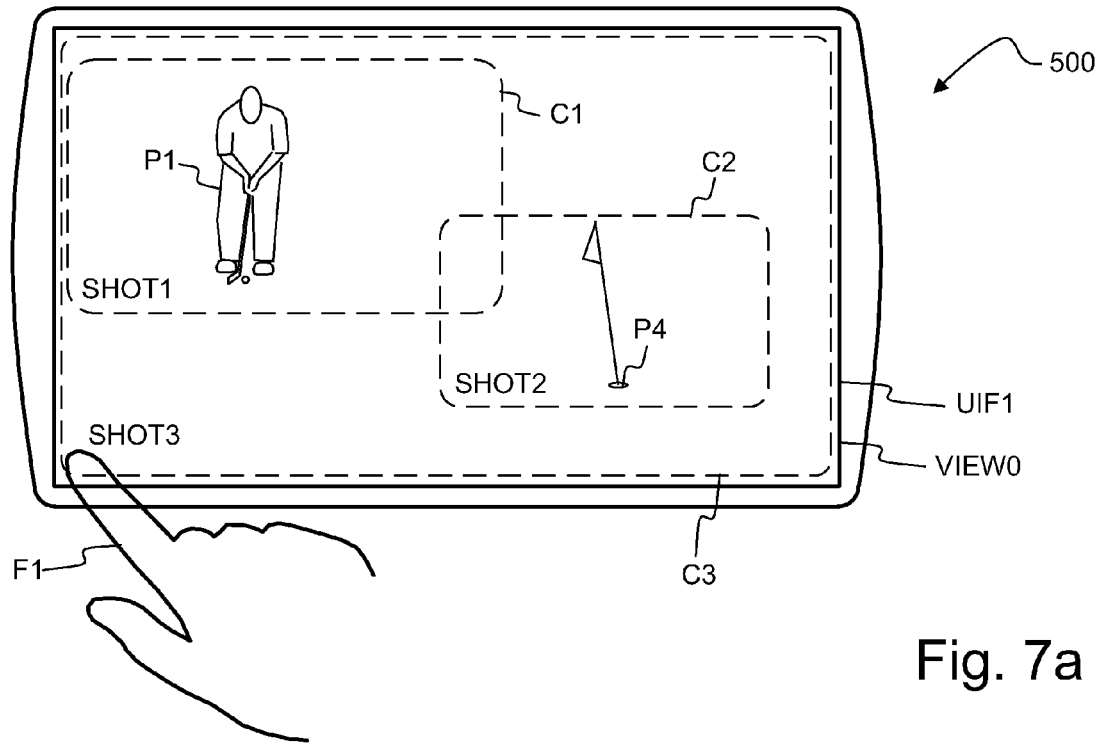
FIG. 7a shows defining a maximum boundary.

Referring to FIG. 7a, a boundary C3 may enclose e.g. substantially the whole area of the preview image VIEW0. The boundary C3 may be defined e.g. by sliding a touch point around the perimeter of the preview image VIEW0. The boundary C3 may also be defined e.g. by touching a predetermined point of the screen, e.g. the bottom left corner or the upper left corner of the preview image VIEW0. The third boundary C3 may correspond to a third active area POR3 of the image sensor 100. The third active area POR3 may enclose substantially the whole active area 101 of the image sensor 100.

Figure 7B:
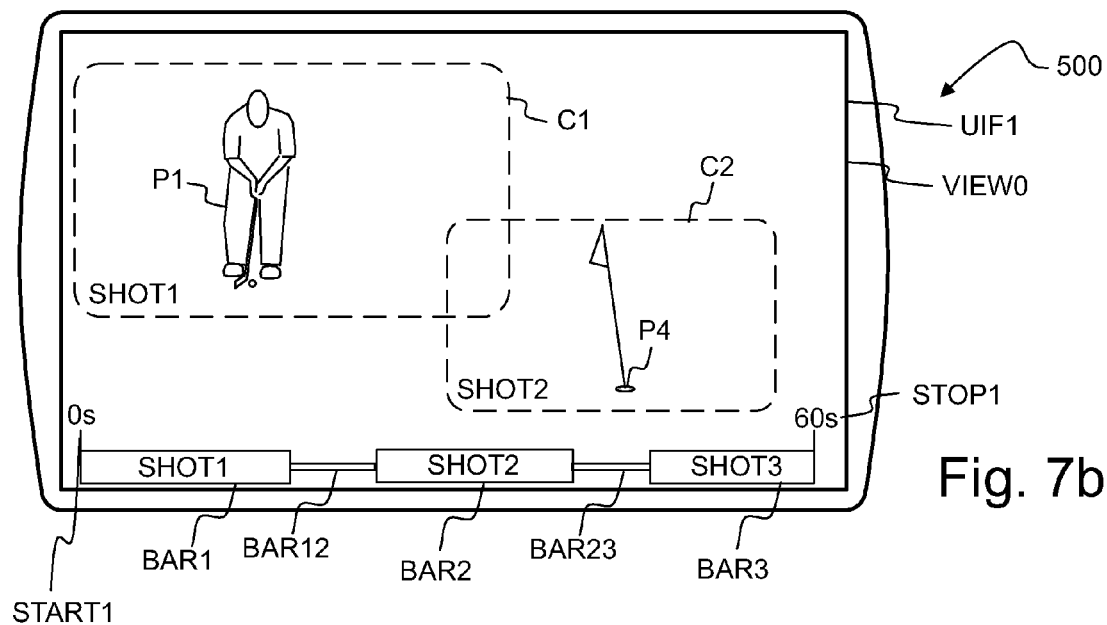
FIG. 7b shows graphical representation of a video script for three video shots.

Referring to FIG. 7b, also the duration of a third video shot S3 may be indicated by showing a bar BAR3 on the timeline. A transition from the second shot S2 to the third shot S3 may be indicated by a bar BAR23. The third bar BAR3 may be indicated by showing a legend "e.g. SHOT3" and/or by using a specific color.

Figure 8A:
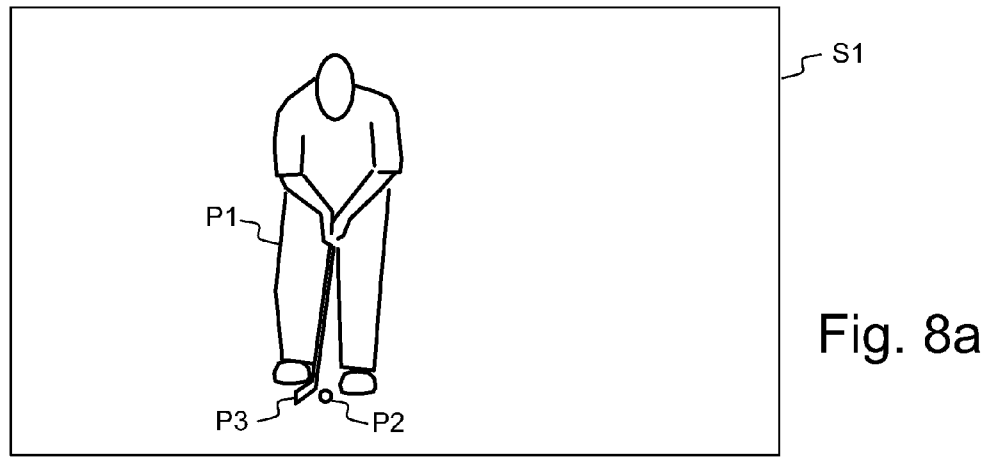
FIG. 8a shows a first video shot of a video sequence.
Figure 8B:
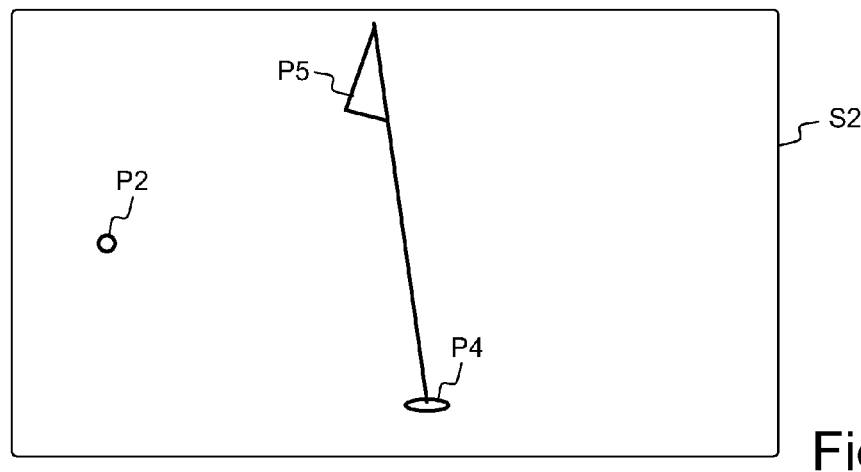
FIG. 8b shows a second video shot of the video sequence.
Figure 8C:
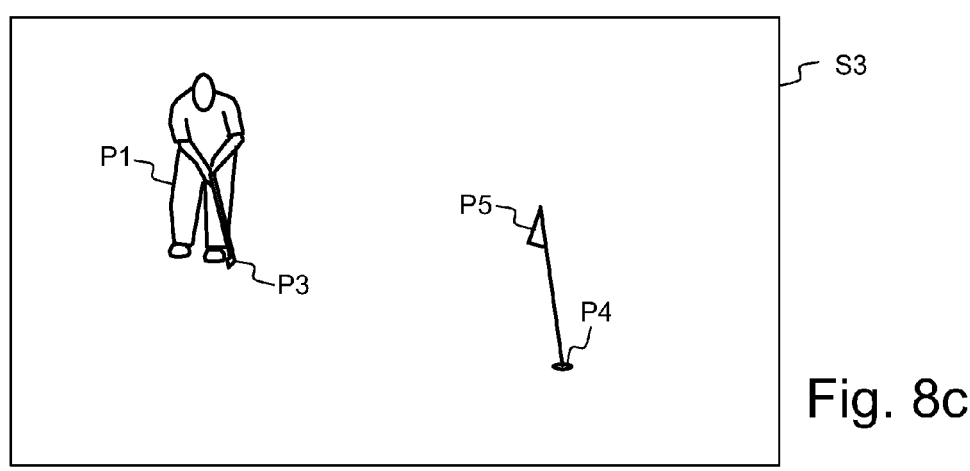
FIG. 8c shows a third video shot of the video sequence.

FIGS. 8a to 8c show image frames of video shots S1, S2, S3 of a video sequence VID1, which has been captured and stored according to the script of FIG. 7a. The video sequence VID1 may show e.g. a golf player P1 hitting the golf ball P2 so that the ball goes into the hole P4. Each video shot S1, S2, S3 of the video sequence VID1 may comprise several different image frames. The video sequence VID1 may comprise the image frames of the video shots S1, S2, S3 such that the second shot S2 is displayed after the first shot S1, and the third shot S3 is displayed after the second shot S2. At least one image P1, P2 in at least one shot S1, S2, S3 may be moving. Displaying the image frames in consecutive order may create an impression of moving objects.

The video sequence VID1 may be captured and stored in the memory based on the boundaries C1, C2, C3. FIG. 8a shows an image frame of the video shot S1, which was recorded by using a sensor portion POR1 corresponding to the boundary C1 of FIG. 7a. FIG. 8b shows an image frame of the video shot S2, which was recorded by using a sensor portion POR2 corresponding to the boundary C2 of FIG. 7a. FIG. 8c shows an image frame of the video shot S3, which was recorded by using a sensor portion POR3 corresponding to the boundary C3 of FIG. 7a.

The image frame shown in FIG. 8a may be called as the first image frame, the image frame shown in FIG. 8b may be called as the second image frame, and the image frame shown in FIG. 8c may be called as the third image frame. The first image frame may show e.g. a close-up view of a first person P1, who is hitting a ball P2 with a golf club P3. The first shot S1 may show the image P1 of a first object (golf player) without showing the image P4 of the second object (the hole).

The second image frame may show e.g. a close-up view of the hole P4 when the ball P2 is moving towards the hole P4. The second shot S2 may show the image P4 of the second object without showing the image P1 of the first object.

The third image frame may show e.g. a wide angle view of the golf player P1 and the hole P4. The third shot S3 may simultaneously show the image P1 of the first object and the image P4 of the second object.

The first image frame, the second image frame, and the third image frame are captured at different times. The image frames shown in FIGS. 8a to 8c are captured after capturing the preview image VIEW0. For example, the sub-image P1 appearing in FIG. 8a may have moved when compared with the sub-image P1 appearing in the preview image VIEW0 of FIG. 7a. For example, the sub-image P2 appearing in FIG. 8b may have moved when compared with the sub-image P2 appearing in FIG. 7a.

The image frames shown in FIGS. 8a to 8c are captured after defining the boundaries C1, C2, C3.

The video shots S1, S2, S3 shown in FIGS. 8a to 8c may be recorded substantially without changing the orientation of the camera 500 during the recording.

In an embodiment, the person appearing the video sequence VID1 may also be the user of the camera 500. The camera 500 may be positioned e.g. on a solid tripod when capturing the preview image VIEW0 by the camera 500. The preview image VIEW0 may be captured e.g. by using a timer or a remote control so that the user may appear in the preview image VIEW0. The user may then walk close to the camera 500 and create the video script SCRIPT1. After the video script SCRIPT1 has been created, the actual recording of the video sequence VID1 may be started e.g. by using a timer.

Figure 9:
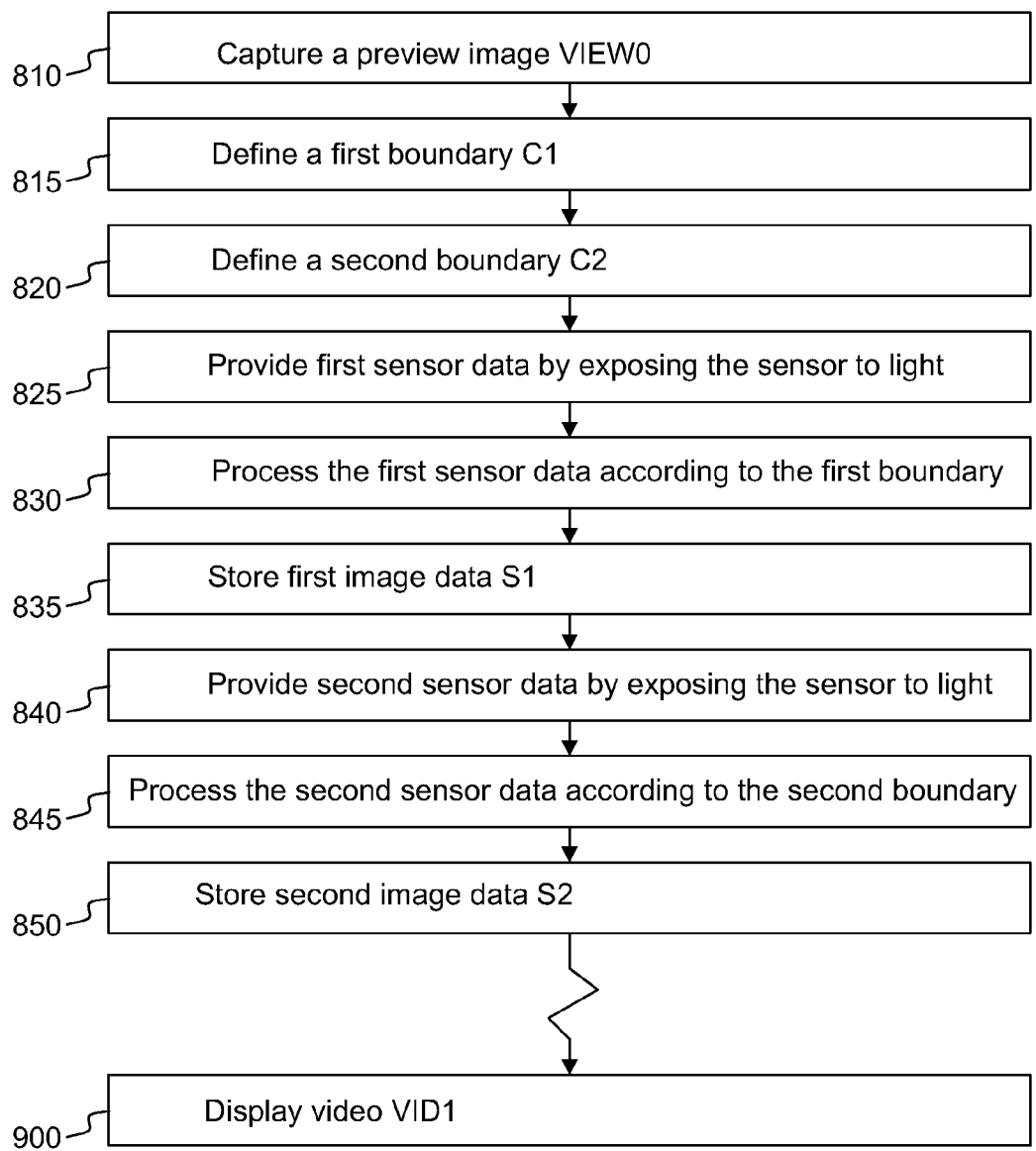
FIG. 9 shows method steps for capturing and displaying video.

FIG. 9 shows method steps for creating a video script SCRPT1, for capturing a video sequence VID1 according to the video script SCRIPT1, and for displaying the video sequence VID1 at a later stage.

In step 810, a preview image VIEW0 may be captured. The preview image VIEW0 may be captured by using the (main) image sensor 100 of the camera 500 or by using an auxiliary image sensor.

In step 815, a size and/or location of the first boundary C1 may be defined with respect to the preview image VIEW0.

In step 820, the size and/or location of the second boundary C2 may be defined with respect to the first boundary C1. The size and/or location of the second boundary C2 may be defined with respect to the preview image VIEW0.

In step 825, a first optical image IMG1 may be formed on the image sensor 100 so that the image sensor 100 may provide first sensor data. In other words, the first sensor data may be provided by exposing the image sensor 100 to the light of the first optical image IMG1.

In step 830, the first sensor data may be processed according to the first boundary C1, in order to determine an image frame of a first group S1. The image frame may represent an image portion, which coincides with the first sensor portion POR1. Sensor data from pixels outside the sensor portion POR1 may be discarded or included in the image frame by using a relatively low number of bytes. In other words, the number of bytes used for storing sensor data from pixels outside the sensor portion POR1 may be lower than the number of bytes used for storing sensor data from pixels inside the sensor portion POR1.

The image frames of the first group S1 may together form the first video shot S1 of the video sequence VID1.

In step 835, the image frame of the first shot S1 may be stored in the memory MEM1. In step 840 a second optical image IMG2 may be formed on the image sensor 100 so that the image sensor 100 may provide second sensor data. In other words, the second sensor data may be provided by exposing the image sensor 100 to the light of the second optical image IMG1.

In step 845, the second sensor data may be processed according to the second boundary C2, in order to determine an image frame of a second group S2. The image frame may represent an image portion, which coincides with the second sensor portion POR2. Sensor data from pixels outside the sensor portion POR1 may be discarded or included in the image frame by using a relatively low number of bytes.

The image frames of the second group S2 may together form the first video shot S2 of the video sequence VID1.

In step 850, the image frame of the second group S2 may be stored in the memory MEM1.

The video sequence VID1 may be displayed at a later stage in step 900. The video sequence VID1 may be displayed on the touch screen of the camera 500 or by using another display. The video sequence VID1 may comprise several image frames of the first group S1 and several image frames of the second group S2.

The method for recording the video sequence VID1 may comprise:
  defining a first boundary C1 with respect to a preview image VIEW0,
  defining a second boundary C2 with respect to a preview image VIEW0,
  determining the position of a first sensor portion POR1 according the position of the first boundary,
  determining the position of a second sensor portion POR2 according the position of the second boundary C2,
  providing first sensor data by forming a first optical image IMG1 on an image sensor 100 after the second boundary C2 has been defined,
  providing second sensor data by forming a second optical image IMG2 on the image sensor 100 after the first optical image IMG1 has been formed,
  determining a first image frame from the first sensor data obtained from the first sensor portion POR1,
  determining a second image frame from the second sensor data obtained from the second sensor portion POR2, and
  storing the first image frame and the second image frame in a memory MEM1.

Figure 10:
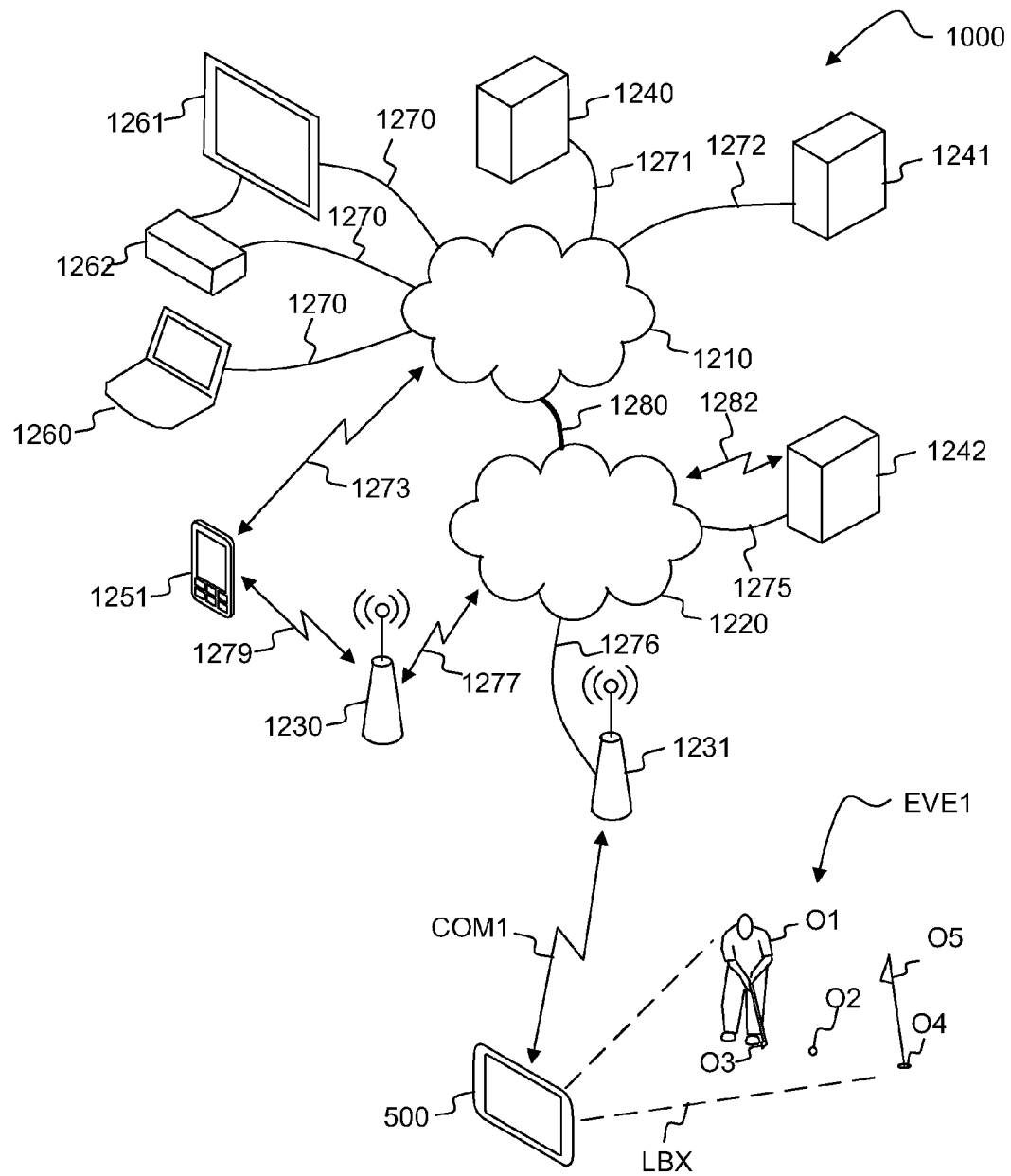
FIG. 10 shows a communication system comprising a camera.

FIG. 10 shows, by way of example, a system 1000 for recording, storing and displaying video sequences VID1. The system 1000 may comprise a camera unit 500 for recording a video sequence VID1. The system 1000 may consist of a single device, or the system 1000 may comprise a plurality of devices arranged to communicate with each other.

The system 1000 may comprise end-user devices such as one or more camera units 500, mobile phones or smart phones 1251, Internet access devices (Internet tablets), personal computers 1260, a display or an image projector 1261 (e.g. a television), and/or a video player 1262. In particular, a mobile phone, a smart phone, an Internet access device, or a personal computer may comprise a camera unit 500 for capturing a video sequence according to the script SCRIPT1. A mobile phone, a smart phone, an Internet access device, or a personal computer may comprise a user interface UIF1 for creating the script SCRIPT1. A script SCRIPT1 created by using a user interface UIF1 of a camera 500 at a first location may be used for recording a video sequence VID1 by said camera 500 at the first location.

In an embodiment, a script created by using a second device at a second location may be communicated to a camera 500, which is at the first location, and the script SCRIPT1 may be used for recording a video sequence VID1 by said camera 500 at said first location.

Distribution and/or storing video sequences VID1 and individual image frames may be implemented in the network service framework with one or more servers and one or more user devices. As shown in the example of FIG. 10, the different devices of the system 1000 may be connected via a fixed network 1210 such as the Internet or a local area network (LAN). The devices may be connected via a mobile communication network 1220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks may be connected to each other by means of a communication interface 1280. A network (1210 and/or 1220) may comprise network elements such as routers and switches to handle data (not shown). A network may comprise communication interfaces such as one or more base stations 1230 and 1231 to provide access for the different devices to the network. The base stations 1230, 1231 may themselves be connected to the mobile communications network 1220 via a fixed connection 1276 and/or via a wireless connection 1277. There may be a number of servers connected to the network. For example, a server 1240 for providing a network service such as a social media service may be connected to the network 1210. A second server 1241 for providing a network service may be connected to the network 1210. A server 1242 for providing a network service may be connected to the mobile communications network 1220. Some of the above devices, for example the servers 1240, 1241, 1242 may be arranged such that they make up the Internet with the communication elements residing in the network 1210. The devices 500, 1251, 1260, 1261, 1262 can also be made of multiple parts. One or more devices may be connected to the networks 1210, 1220 via a wireless connection 1273. The communication COM1 between the camera 500 and a second device of the system 100 may be fixed and/or wireless. One or more devices may be connected to the networks 1210, 1220 via communication connections such as a fixed connection 1270, 1271, 1272 and 1280. One or more devices may be connected to the Internet via a wireless connection 1273. One or more devices may be connected to the mobile network 1220 via a fixed connection 1275. The camera 500 may be connected to the mobile network 1220 via a wireless connection COM1, 1279 and/or 1282. The connections 1271 to 1282 may be implemented by means of communication interfaces at the respective ends of the communication connection. A user device 500, 1251 or 1260 may also act as web service server, just like the various network devices 1240, 1241 and 1242. The functions of this web service server may be distributed across multiple devices. Application elements and libraries may be implemented as software components residing on one device. Alternatively, the software components may be distributed across several devices. The software components may be distributed across several devices so as to form a cloud.

The camera 500 may be used to record a video sequence of an event EVE1 where one or more objects O1, O2, O3, O4, O5 are moving. During the recording, the image sensor of the camera may receive light LBX reflected and/or emitted from the one or more objects. O1 may denote e.g. a person playing golf, O2 may denote e.g. a golf ball, O3 may denote e.g. a golf club, O4 may denote e.g. a golf hole, and O5 may denote e.g. a flag.

The recorded video sequence VID1 may be stored and/or communicated by using a data compression codec, e.g. by using H.264, WMV, DivX Pro Codec, or a future codec.

FIG. 11a shows a portable device 500, which comprises the image sensor 100. The device 500 may comprise the imaging optics 200 arranged to form optical images IMG1, IMG2, IMG3 on the image sensor 100. The device 500 may comprise at least one processor CNT1, 400, a memory MEM2 including computer program code PROG1 configured to, with the at least one processor, cause the apparatus to perform at least the following:
 receive a first instruction, which defines the position of a first boundary C1 with respect to a preview image VIEW0,
 receiving a second instruction, which defines the position of a second boundary C2 with respect to the preview image, a framing path T12, or a tracking mode,
 determining the position POS1 of a first sensor portion POR1 according the position of the first boundary C1,
 determining the position POS2 of a second sensor portion POR2 according the second instruction,
 providing first sensor data SDATA1 by forming a first optical image IMG1 on the image sensor 100 after receiving the first instruction and the second instruction,
 providing second sensor data by forming a second optical image IMG2 on the image sensor 100 after the first optical image IMG1 has been formed,
 determining a first image frame from the first sensor data SDATA1 obtained from the first sensor portion POR1,
 determining a second image frame from the second sensor data obtained from the second sensor portion POR2, and
 storing or transmitting the first image frame and the second image frame.

The device 500 may comprise:
 a user interface for receiving a first instruction and a second instruction, wherein the first instruction defines the position of a first boundary with respect to a preview image, and the second instruction defines the position of a second boundary with respect to a preview image, a framing path, or a tracking mode,
 an image sensor,
 imaging optics to form an optical image on the image sensor,
 one or more processors configured to:
 determine the position of a first sensor portion according the position of the first boundary,
 determine the position of a second sensor portion according the second instruction,
 obtain first sensor data from the first sensor portion after receiving the first instruction and the second instruction,
 obtain second sensor data from the second sensor portion after obtaining the first sensor data,
 determine a first image frame from the first sensor data obtained from the first sensor portion,
 determine a second image frame from the second sensor data obtained from the second sensor portion.

The device 500 may comprise a memory MEM1 for storing the first image frame and the second image frame, and/or the device 500 may comprise the communication unit RXTX1 configured to transmit the first image frame and the second image frame. The communication unit RXTX1 may also be called e.g. as the communication module RXTX1.

The portable device 500 may comprise a communication unit RXTX1 for transmitting data wirelessly e.g. to the Internet 1210, and/or to a mobile telephone network 1220. The device 500 may be e.g. a mobile phone, a smartphone, a communicator, a portable computer, a personal digital assistant (PDA), and/or a video camera. The device 500 may comprise one or more microphones 1258 for converting sound waves into audio signals. The device 500 may comprise one or more speakers 1255 for reproducing audio signals. A microphone 1258 may be used e.g. to implement a mobile phone functionality. A microphone 1258 may be used e.g. to record an audio signal associated with the video sequence VID1. A microphone 1258 may be used e.g. to receive spoken instructions.

The portable device 500 may comprise the user interface UIF1 for receiving instructions, e.g. for defining the first boundary, defining the second boundary, defining a framing path, and/or defining a tracking mode. In an embodiment, the portable device 500 may comprise the image sensor 100 and the user interface UIF1 so that the distance between the image sensor 100 and the user interface UIF1 is smaller than e.g. 0.5 m. However, the portable device 500 may also be configured to receive instructions from a remote user interface UIF1. In this case, the portable device 500 does not need to comprise the user interface UIF1.

Referring to FIG. 11b, the first portable device 500 may comprise the image sensor 100, and a user interface UIF1 may be implemented in a second portable device 502, which is mechanically separate from the first portable device 500. The second device 502 may comprise a communication module RXTX2 for wirelessly communicating instructions to the first device 500. The distance between the image sensor 100 and the user interface UIF1 of the second device 500 may be e.g. greater than 0.5 m, greater than 5 m, or even greater than 1 km. The first device 500 may be e.g. a first mobile phone, and/or the second device 502 may be e.g. a second mobile phone. Also in this case, the user interface UIF1 of the second device 502 may be used for e.g. for defining the first boundary, defining the second boundary, defining a framing path, and/or defining a tracking mode.

FIG. 11c shows a server 1240, which comprises a memory 1245, one or more processors 1246, 1247, and computer program code 1248 residing in the memory 1245 for implementing, for example, the functionalities of a software application like a social media service. Servers 1240, 1241, 1242 shown in FIG. 11 may comprise these elements for employing functionality relevant to each server. A user device 500, 1251 or 1260 may also act as web service server, just like the various network devices 1240, 1241 and 1242. The functions of this web service server may be distributed across multiple devices, too. A server 1240 may comprise a memory MEM1 for storing the video sequence VID1 recorded by using the image sensor 100. A server 1240 may comprise a memory MEM3 for storing a video script SCRIPT1, for recording the video sequence VID1. A server 1240 may comprise a memory MEM4 for storing default parameters DEF1, for recording the video sequence VID1.

Figure 12A:
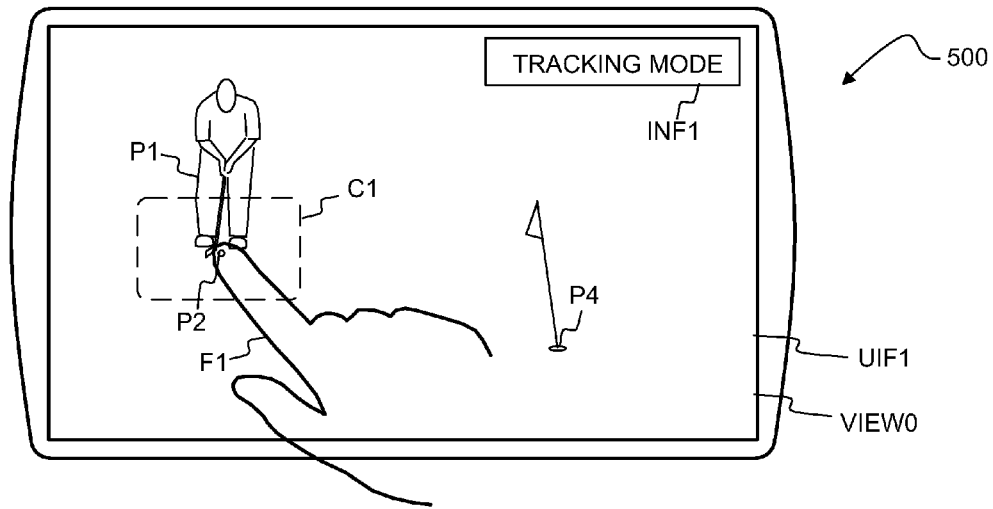
FIG. 12a shows defining the position of a first boundary and defining a tracking mode.
Figure 12B:
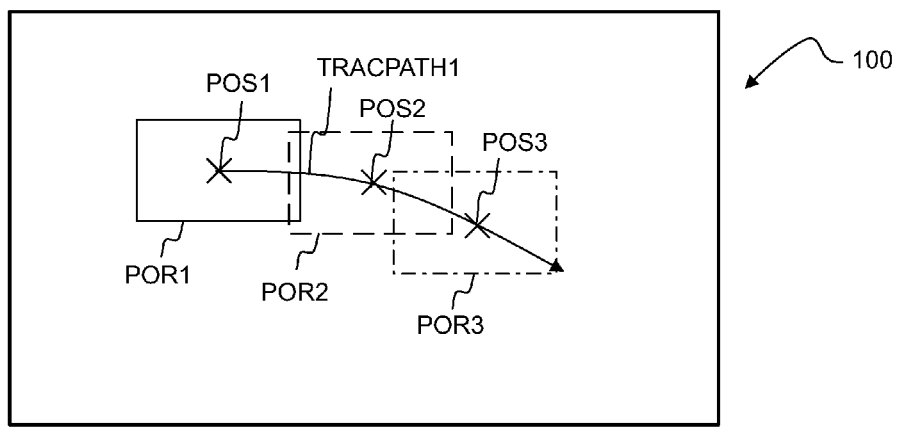
FIG. 12b shows sensor portions determined by tracking the movements of an object.

Referring to FIGS. 12a and 12b, the camera 500 may be configured to operate such that the positions of the sensor portions POR1, POR2, POR3 track (i.e. follow) the sub-image of a moving object. This may increase the probability that the sub-image of the object will appear in the recorded video sequence VID1 also in a situation where it is difficult to predict the velocity and the direction of the object. Referring to FIG. 12a, the camera 500 may be set to a track the object e.g. by double-tapping the sub-image of the object appearing in the preview image VIEW0. The same feature (e.g. the head of a person P1 or a moving ball P2) may appear in the preview image VIEW0 and also in the video sequence VID1. Information INF1 (e.g. the text "tracking mode") may be displayed in order to indicate that the camera 500 will operate in the tracking mode during recording the video sequence VID1.

Creating the video script SCRIPT1 may comprise providing a first instruction and a second instruction. The first instruction may define the position of a first boundary C1, and the second instruction may define that the movement of an object inside the first boundary C1 will be tracked. Consequently, the positions of the further boundaries POR2, POR3 may be defined by the trajectory of the moving object. The positions of the further boundaries POR2, POR3 may be defined by the speed and the direction of movement of said object. The moving object may be e.g. the golf ball shown in FIG. 8b and in FIG. 10.

Referring to FIG. 12b, the optics 200 forms an optical image (e.g. the image IMG1) on the image sensor 100. The optical images may comprise a sub-image P2 of the moving object. The sub-image P2 may move when the object O2 moves. The sub-image P2 may move e.g. along the path TRACPATH1 shown in FIG. 12b. For example, the sub-image P2 of a flying golf ball O2 may draw a curved path TRACPATH1 on the image sensor 100. The instantaneous position of the sub-image P2 may be determined e.g. by using a pattern recognition algorithm. The camera 500, in particular, the control unit CNT1 of the camera 500 may be configured to determine the instantaneous position of the sub-image P2 by using a pattern recognition algorithm. The control unit CNT1 may be configured to determine the positions of two or more sensor portions POR1, POR2, POR3 used during capturing the video sequence VID1. The control unit CNT1 may be configured to determine the positions of the sensor portions POR2, POR3 based on the detected (instantaneous) position of the sub-image P2 such that the sensor portions POR2, POR3 are positioned substantially along the path TRACPATH1. Recording the video sequence VID1 may comprise gathering image information mainly from the sensor portions POR1, POR2, which are defined by tracking the movement of the sub-image. POS1 may denote the position of the first sensor portion POR1 with respect to the image sensor 100. POS2 may denote the position of a second sensor portion POR2. POS3 may denote the position of a third sensor portion POR3.

The method for recording a video sequence VID1 may comprise:
  defining the position of a first boundary C1 with respect to a sub-image P2 appearing in a preview image VIEW0,
  defining that the operating mode is set to a tracking mode,
  determining the position POS1 of a first sensor portion POR1 according to the position of the first boundary C1,
  determining the position POS2 of a second sensor portion POR2 according to an instantaneous position of the sub-image P2,
  providing first sensor data by forming a first optical image IMG1 on an image sensor 100 after defining the first boundary and after defining the tracking mode,
  providing second sensor data by forming a second optical image IMG2 on the image sensor 100 after the first optical image IMG1 has been formed,
  determining a first image frame from the first sensor data obtained from the first sensor portion POR1,
  determining a second image frame from the second sensor data obtained from the second sensor portion POR2, and
  storing and/or transmitting the first image frame and the second image frame in a memory MEM1.

In an embodiment, the start of the recording of the video sequence VID1 may be triggered by a movement of an object. The recording may be started when anything moves within an image area defined by a boundary C1. The recording may be stopped when nothing moves within an image area defined by a boundary C1.

Figure 13A:
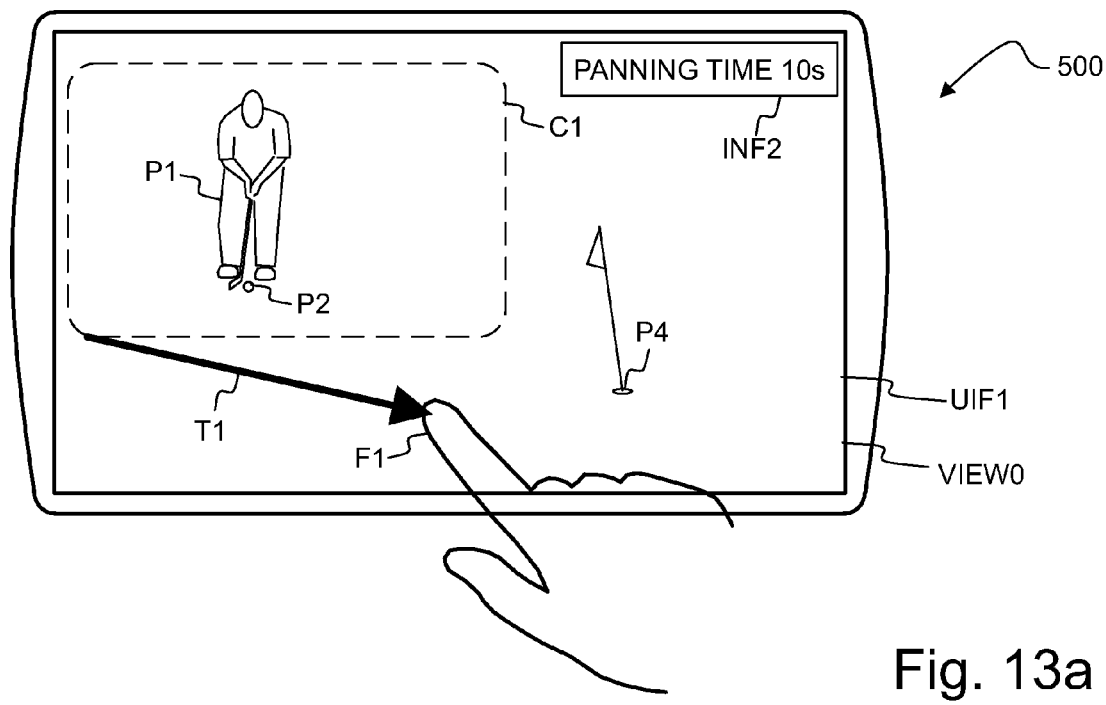
FIG. 13a shows defining a panning direction.

Referring to FIG. 13a, creating the video script SCRIPT1 may comprise defining the position of a first boundary C1 and defining a first path T1 for the further boundaries. The first path T1 defined with respect to the preview image VIEW0 may be called as the framing path. The first path T1 may be defined with respect to the preview image VIEW0. e.g. by the user by using the user interface UIF1. The first path T1 may be defined by using a touch screen. The first path T1 may be associated with a speed value. The speed value may be called e.g. as the panning speed value. The speed value may have a predetermined default value, wherein the speed value may also be user-definable. The speed value may be determined e.g. by using the user interface, in particular by using the touch screen. The first path may be displayed e.g. as a graphical arrow on the touch screen. The direction of the arrow may indicate the direction of the first path. The length of the displayed arrow may indicate the speed value associated with the first path. Information INF2 indicative of the speed value may be displayed. For example, displaying the text "panning time 10s" may indicate that a panning operation corresponding to the length of the displayed graphical arrow will be carried out during a time period of 10 seconds.

Figure 13B:
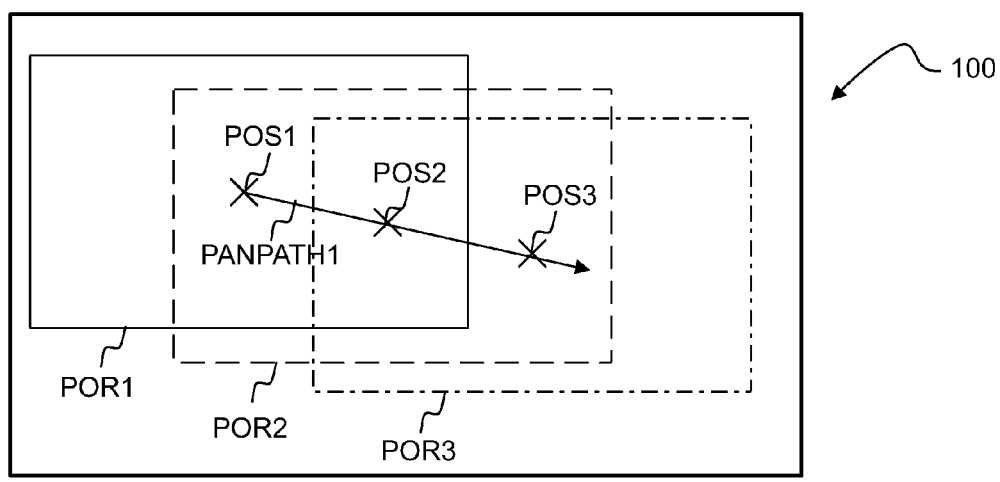
FIG. 13b shows the locations of sensor portions corresponding to the panning direction.

Referring to FIG. 13b, the first path T1 may correspond to a second path PANPATH1, which is defined with respect to the image sensor 100. The control unit CNT1 may determine the second path PANPATH1 according to the first path T1. The second path PANPATH1 may correspond to the first path T1. The first boundary C1 may define the position of a first sensor portion POR1, which will be used during capturing the video sequence VID1. The second path PANPATH1 may define the positions of further sensor portions POR2, POR3, which will be applied during capturing the video sequence VID1. The further sensor portions POR2, POR3 may be located along the second path PANPATH1, which corresponds to the first path T1. The displacement between the first sensor portion POR1 and a second sensor portion POR2 may be defined by the speed value. The position of the second sensor portion POR2 may be defined by the first path T1 and the speed value.

Creating the script SCRIPT1 may comprise providing a first instruction and a second instruction. The user may provide a first instruction, which defines the position of the first boundary C1. The user may provide a second instruction, which defines the position of the second boundary C2.

The user may provide a second instruction, which defines the position of the second boundary C2, a framing path, or a tracking mode. The framing path T1 may define a panning direction. Defining the tracking mode means that camera 500 is set to a tracking mode, i.e. the framing may track the movements of a sub-image of an object.

Determining the position of a sensor portion POR1 according to the position of a boundary C1, C2 may also be interpreted to represent a mapping operation from the preview image space to the image sensor space. One or more processors CNT1, 400 of the device 500 may be configured to determine the size and/or position of a sensor portion POR1, POR2 by carrying out a mapping operation, where the size and/or position of the boundary C1, C2 is mapped from the two-dimensional preview image space to the two-dimensional image sensor space. One or more processors CNT1, 400 of the device 500 may be configured to determine a path PANPATH1 by carrying out a mapping operation, where the framing path T1, T12 is mapped from the two-dimensional preview image space to the two-dimensional image sensor space.

The length of a time period needed for creating the video script SCRIPT1 may be substantially reduced by defining one or more default parameters DEF1. A default parameter may define e.g. the duration of a first video shot S1 associated with the first boundary C1. The default parameters DEF1 may be defined by the user e.g. before capturing the preview image VIEW0 or before defining the boundaries C1, C2. The default parameters DEF1 may also be received from a second device.

When creating a script SCRIPT1 with a touch screen, the user may input information by touching the touch screen with a touching member. The touching member may be e.g. a finger or a stylus. Touching the touch screen may refer to actual physical contact between the touching member and the screen. Touching the touch screen may also mean bringing the touching member close to the screen so that the distance between the finger F1 and the screen is smaller than a predetermined distance (e.g. smaller than 1% of the width of the touch screen).

The portable camera 500 may be held in position e.g. by hand and/or by using a (temporary) stand. In an embodiment, the camera 500 may be held at a first camera position when capturing the preview image VIEW0, and the camera may be moved (e.g. lifted or turned) to facilitate creating the script SCRIPT1 by the user interface. After the first instruction and the second instruction of the script SCRIPT1 have been provided, the camera 500 may be moved again to a second camera position, and the camera 500 may be held at the second camera position during recording the video sequence VID1. The camera position used when recording the video sequence VID1 may also be called e.g. as a "shooting position". The first camera position may be exactly the same as the second camera position. However, the first camera position may also be (slightly) different from the second camera position because the camera was moved between capturing the preview image VIEW0 and recording the video sequence VID1. As a consequence, the sub-images of objects appearing in the recorded video sequence VID1 may be slightly displaced.

In an embodiment, a difference between the first camera position and the second camera position may be compensated. The positions of the sensor portions POR1, POR2, POR3 may be arranged to track the position of a sub-image P1, in order to compensate the difference between the first camera position and the second camera position. For example, the user may define that the center of the first boundary C1 is fixed to the position of a sub-image P1 appearing in the preview image VIEW0. At a later stage, if the same sub-image P1 still appears in an optical image IMG1 when starting the recording, the position POS1 of the first sensor portion POR1 may be determined such that the position of the first sensor portion POR1 substantially coincides with the position of the sub-image P1. The camera 500 may comprise an image recognition unit, which may be configured to detect the position of a sub-image P1, which appears in the images VIEW0, IMG1. The camera 500 may comprise one or more processors configured to detect a spatial displacement between the position of the sub-image P1 in the preview image VIEW0 and the position of the sub-image P1 in the optical image IMG1. The camera 500 may comprise one or more processors CNT1, 400 configured to adjust the positions of the sensor portions POR1, POR2 according to said spatial displacement, in order to compensate the difference between the camera positions.

For the person skilled in the art, it will be clear that modifications and variations of the device and the method according to the present invention are perceivable. The figures are schematic. The particular embodiments described above with reference to the accompanying drawings are illustrative only and not meant to limit the scope of the invention, which is defined by the appended claims.

The invention claimed is:

1. A method, comprising:
receiving a first instruction, which defines the position of a first boundary with respect to a preview image,
receiving a second instruction, which defines the position of a second boundary with respect to the preview image, which defines a framing path, or which defines a tracking mode,
determining the position of a first sensor portion according to the position of the first boundary,
determining the position of a second sensor portion according to the second instruction,
providing first sensor data by forming a first optical image on an image sensor after receiving the second instruction,
providing second sensor data by forming a second optical image on the image sensor after the first optical image has been formed,
determining a first image frame from the first sensor data obtained from the first sensor portion,
determining a second image frame from the second sensor data obtained from the second sensor portion, and
performing at least one of storing or transmitting the first image frame and the second image frame.

2. The method of claim 1 wherein the first image frame mainly represents sensor data obtained from the first sensor portion.

3. The method of claim 1 wherein the second sensor portion is spatially displaced with respect to the first sensor portion.

4. The method of claim 3 wherein the second sensor portion does not overlap with the first sensor portion.

5. The method of claim 1 wherein the area of the first sensor portion is smaller than 50% of the active area of the image sensor.

6. The method of claim 1 wherein the preview image is displayed on a touch screen, and the position of the first boundary is defined by using the touch screen.

7. The method of claim 1 further comprising determining an intermediate sensor portion of the image sensor, wherein the sensor data is obtained from the intermediate sensor portion between the first time period and the second time period, and the position of the intermediate sensor portion is located between the position of the first sensor portion and the position of the second sensor portion.

8. The method of claim 1 wherein the position of the second sensor portion is determined according to the framing path and according to a speed value.

9. The method of claim 1 further comprising tracking the movement of an object such that the position of the second sensor portion is determined according to the instantaneous position of an image of said object.

10. A computer program product embodied on a non-transitory computer readable medium, comprising computer program code configured to, when executed on at least one processor, cause an apparatus or a system to:
receive a first instruction, which defines the position of a first boundary with respect to a preview image,
receive a second instruction, which defines the position of a second boundary with respect to the preview image, which defines a framing path, or which defines a tracking mode,
determine the position of a first sensor portion according to the position of the first boundary,
determine the position of a second sensor portion according to the second instruction,
provide first sensor data by forming a first optical image on an image sensor after receiving the second instruction,
provide second sensor data by forming a second optical image on the image sensor after the first optical image has been formed,
determine a first image frame from the first sensor data obtained from the first sensor portion,
determine a second image frame from the second sensor data obtained from the second sensor portion, and
store and/or transmit the first image frame and the second image frame.

11. An apparatus comprising at least one processor, a memory including computer program code, the memory and the computer program code configured to, with the at least one processor, cause the apparatus to perform at least the following:
receive a first instruction, which defines the position of a first boundary with respect to a preview image,
receive a second instruction, which defines the position of a second boundary with respect to the preview image, which defines a framing path, or which defines a tracking mode,
determine the position of a first sensor portion according to the position of the first boundary,
determine the position of a second sensor portion according to the second instruction,
provide first sensor data by forming a first optical image on an image sensor after receiving the second instruction,
provide second sensor data by forming a second optical image on the image sensor after the first optical image has been formed,
determine a first image frame from the first sensor data obtained from the first sensor portion,
determine a second image frame from the second sensor data obtained from the second sensor portion, and
perform at least one of store or transmit the first image frame and the second image frame.

12. The apparatus of claim 11 wherein the first image frame mainly represents sensor data obtained from the first sensor portion.

13. The apparatus of claim 11 wherein the second sensor portion is spatially displaced with respect to the first sensor portion.

14. The apparatus of claim 13 wherein the second sensor portion does not overlap with the first sensor portion.

15. The apparatus of claim 11 wherein the area of the first sensor portion is smaller than 50% of the active area of the image sensor.

16. The apparatus of claim 11 further comprising a touch screen for displaying the preview image and for receiving the first instruction.

17. The apparatus of claim 11, wherein the apparatus is further caused to determine an intermediate sensor portion of the image sensor such that sensor data is obtained from the intermediate sensor portion between the first time period and the second time period, and the position of the intermediate sensor portion is located between the position of the first sensor portion and the position of the second sensor portion.

18. The apparatus of claim 11 wherein the apparatus is further caused to determine the location of the second sensor portion according to the framing path and according to a speed value.

19. The apparatus of claims 11, wherein the apparatus is further caused to track the movement of an object such that the position of the second sensor portion is determined according to the instantaneous position of the image of said object.

20. The apparatus of claim 11 further comprising the image sensor for providing the first sensor data and the second sensor data.

* * * * *